United States Patent [19]

Dauerer et al.

[11] Patent Number: 5,475,833
[45] Date of Patent: Dec. 12, 1995

[54] DATABASE SYSTEM FOR FACILITATING COMPARISON OF RELATED INFORMATION STORED IN A DISTRIBUTED RESOURCE

[75] Inventors: Norman J. Dauerer, Hopewell Junction; Edward E. Kelley, Wappingers Falls, both of N.Y.

[73] Assignee: International Business Machines Corporation, Armonk, N.Y.

[21] Appl. No.: 755,036

[22] Filed: Sep. 4, 1991

[51] Int. Cl.[6] .................................................. G06F 17/30
[52] U.S. Cl. ........................... 395/600; 364/401; 364/403; 364/DIG. 1; 364/226.3; 364/282.4
[58] Field of Search .................................. 395/200, 600, 395/650, 700; 364/401, 403

[56] References Cited

U.S. PATENT DOCUMENTS

| | | | |
|---|---|---|---|
| 4,053,871 | 10/1977 | Vidalin et al. | 395/600 |
| 4,068,300 | 1/1978 | Bachman | 395/600 |
| 4,104,721 | 4/1978 | Markstein et al. | 395/375 |
| 4,443,860 | 4/1984 | Vidalin | 395/425 |
| 4,542,477 | 9/1985 | Noyori et al. | 395/600 |
| 4,621,321 | 11/1986 | Boebert et al. | 395/425 |
| 4,631,664 | 12/1986 | Bachman | 395/600 |
| 4,692,858 | 9/1987 | Redford et al. | 345/157 |
| 4,713,753 | 12/1987 | Boebert et al. | 395/600 |
| 4,714,995 | 12/1987 | Materna et al. | 395/200 |
| 4,791,561 | 12/1988 | Huber | 395/600 |
| 4,817,050 | 3/1989 | Komatsu et al. | 395/600 |
| 4,821,175 | 4/1989 | Hikita et al. | 395/600 |
| 4,827,423 | 5/1989 | Beasley et al. | 364/468 |
| 4,851,999 | 7/1989 | Moriyama | 395/600 |
| 4,888,681 | 12/1989 | Barnes et al. | 395/600 |
| 4,891,503 | 1/1990 | Jewell | 235/380 |
| 4,891,785 | 1/1990 | Donohoo | 395/200 |
| 4,951,249 | 8/1990 | McClung et al. | 380/4 |
| 4,958,273 | 9/1990 | Anderson et al. | 395/800 |
| 4,959,774 | 9/1990 | Davis | 395/575 |
| 4,967,348 | 10/1990 | Naito et al. | 395/600 |
| 4,984,272 | 1/1991 | McIlroy et al. | 380/25 |
| 5,136,707 | 8/1992 | Block et al. | 395/600 |

OTHER PUBLICATIONS

IBM Disclosure Bulletin, Bamford, R. J. Access Control for a Shared Data Base, Sep. 1980 vol. 23 No. 4.
IBM Technical Disclosure Bulletin, Determining Database Object Authorization, Feb. 1990 vol. 32 No. 9B.
Concordance 1990 Edition, United States Patent Classification to International Patent Classification.

*Primary Examiner*—Thomas G. Black
*Assistant Examiner*—John C. Loomis
*Attorney, Agent, or Firm*—Whitham, Curtis, Whitham & McGinn; Alison D. Mortinger

[57] ABSTRACT

A database system and application for facilitating comparison of data between manufacturing lines or other business processes which are geographically separated or distributed includes a storage arrangement in which data from remote locations is shadowed and can be updated as necessary only from remote locations. The Intersite Line Comparison system (ILC) also controls the invoking of other applications in a manner which is transparent to the user and dynamically builds data comparisons in desired formats under user-friendly, menu-driven control. Automatic data conversion, including tables of equivalent groups of operations at different sites is provided to facilitate meaningful comparison of data from different sites.

13 Claims, 27 Drawing Sheets

```
INTERSITE LINE COMPARISON SYSTEM (SECURITY CLASSIFICATION)     A00
ENTER THE NUMBER OF THE SITE THAT YOU WANT TO SEE.             1_
OPTIONALLY - ENTER THE NUMBER OF ANOTHER SITE THAT
   YOU WANT TO COMPARE.                                        2_
ENTER THE NUMBER OF ONE OF THE ITEMS.                          16
_____

******SELECT ONE OR TWO OF THE FOLLOWING SITES******
1.   LOCATION 1
2.   LOCATION 2
3.   LOCATION 3
4.   LOCATION 4
*SELECT ONE OF THE FOLLOWING ITEMS (FOR MORE ITEMS PRESS PF8)*
        YIELD/LOSS REPORTS

4.  YIELD AND LOSS REPORTS  (1,2,3) (TYPED)
5.  YIELD AND LOSS REPORTS  (1,2,3) (CERAMICS)
27. YIELD COMPARISONS (1,2) (INCLUDES GRAPHS)
29. YIELD PLANS FOR 9211 (1,3)
34. LOSS CODES (2)
36. YIELD HISTORY (1,2)
38. TEST OF SPC (3) INCOMING TO PLATING
        (SOFT REPAIR AND LOSS REPORT)
39. PRESENTATION YIELD GRAPHS (1)

PROCESS FLOWS

11. J1 (1,2) GREEN SHEET AND PASTE (TYPE A)
12. M1 (1,2) GREEN SHEET AND PASTE (TYPE B)

01 HELP  03 QUIT  07 BKWD  08 FWD
====>
```

FIG. 4

INTERSITE LINE COMPARISON SYSTEM (SECURITY CLASSIFICATION)   A00

ENTER THE NUMBER OF THE SITE THAT YOU WANT TO SEE.   1_
OPTIONALLY - ENTER THE NUMBER OF ANOTHER SITE THAT
   YOU WANT TO COMPARE.   2_
ENTER THE NUMBER OF ONE OF THE ITEMS.   16
PRESS THE ENTER KEY WHEN YOU HAVE FILLED IN THE DATA.

---

13. J3 (1,2) LAYER PERSONALIZATION (TYPE A)
14. M3 (1,2) LAYER PERSONALIZATION (TYPE B)
15. J4 (1,2,3) SUBSTRATE MANUFACTURE
16. M4 (1) M4/M5 (2) SUBSTRATE MANUFACTURE (TYPE A)
17. F4 (1,3) M4 (2) SUBSTRATE MANUFACTURE (TYPE B)
19. M4/M5 (2) SUBSTRATE MANUFACTURE (TYPE C)
20. M4/M5 (2) SUBSTRATE MANUFACTURE (TYPE D)

DOCUMENTATION

25. PVA PROCESS VISUAL AIDS (1,2)
30. ENGINEERING SPECS (SAMPLE ONLY FOR TESTING)
31. LOCATION 2 PROZESS ANWELSUNG (2) (TYPE A)
35. LOCATION 2 PROZESS ANWELSUNG (2) (TYPE B)

MISCELLANEOUS

3. PRODUCT DESCRIPTION (1)
6. CYCLE TIME REPORTS (1,2)
7. M/E FAMILY CODES (1)
8. UNUSED CHIP SITE LOCATIONS (1)
9. P.E. TEST FILE (1)
10. PROCESS CHEMICALS (1,2)

01 HELP  03 QUIT  07 BKWD  08 FWD
====>

FIG. 5

```
INTERSITE LINE COMPARISON SYSTEM                                A026
MOVE THE CURSOR TO THE LINE YOU WISH TO SELECT AND PRESS PF2
     M4 (F), M4/M5 (S) SUBSTRATE MFG (TECHNOLOGY B)

LOCATION 1 PROCESS FLOW AND DETAIL OPERATIONS.
LOCATION 2 PROCESS FLOW AND DETAIL OPERATIONS.
LINE CROSS REFERENCE LIST FROM LOCATION 1 POINT OF VIEW.
LINE CROSS REFERENCE LIST FROM LOCATION 2 POINT OF VIEW.
OPERATION CROSS REFERENCE LIST FROM LOCATION 1 POINT OF VIEW.
OPERATION CROSS REFERENCE LIST FROM LOCATION 2 POINT OF VIEW.
LIST OF COMMON OPERATIONS THAT DO NOT HAVE THE SAME TITLES.
LOCATION 1 OPERATIONS NOT FOUND ON THE PROCESS CONVERSION TABLE.
LOCATION 2 OPERATIONS NOT FOUND ON THE PROCESS CONVERSION TABLE.
SELECT LOCATION 1 PROCESS FLOW HISTORY.
SELECT LOCATION 2 PROCESS FLOW HISTORY.

01 HELP   02 SELECT  03 QUIT  07 BKWD  08 FWD
====>
```

FIG. 6

```
INTERSITE LINE COMPARISON SYSTEM                                A036
MOVE THE CURSOR TO THE LINE YOU WISH TO SELECT AND PRESS PF2 OR
PF4.
        COMPARISON OF THE LOCATION 1 AND THE LOCATION 2 LINES
    =================================================
    ---------------------------------------------------
 *> 1421      SINTERING                        M4   | *> 3792 SINTER
 14214300     SINTER/CONTACT SHEET REMOVE           | 3760 SINTER /
 *> 1501      SINTER MEASURE / INSPECT         M4
 15014305     POST SINTER EXPANSION                 | 3790 POST SINT
 15014310     CAMBER MEASUREMENT                    | 3790 POST SINT
 15014315     POST SINTER VISUAL INSPECT            | 3790 POST SINT
 15014320     QA POST SINTER MONITOR                | 3790 POST SINT
    ---------------------------------------------------
 *> 1581      BACKFILL                         M4   | *> 3892 BACKF
                                                    | 3830 THICKNESS

01 HELP   02 LOCATION 1   03 QUIT   04 LOCATION 2   05       06
07 BKWD   08 FWD          09 PRINT  10 RIGHT        11 LEFT  12
====>
```

FIG. 7

```
INTERSITE LINE COMPARISON SYSTEM (SECURTIY CLASSIFICATION)    A01
MOVE THE CURSOR TO THE ITEM YOU WISH TO SELECT AND PRESS PF2
NUMBER          M4 (F), M4/M5 (S) SUBSTRATE MFG (TECHNOLOGY B)
────────────────────────────────────────────────────────────────
  *             *─────────────────────────────────────────────*
  *>            | 0001 PC RELEASE                         M4  |
  *             *─────────────────────────────────────────────*
0001A001            PC RELEASE
  *             *─────────────────────────────────────────────*
  *>            | 1011 MFG CONTROL CENTER HOLD            M4  |
  *             *─────────────────────────────────────────────*
10110100            MFG CONTROL CENTER HOLD
  *             *─────────────────────────────────────────────*
  *>            | 1289 AUTO PATTERN INSPECTION            M4  |
  *             *─────────────────────────────────────────────*
12593110            PATTERN INSPECT
12893120            VERIFY AND REPAIR
  *             *─────────────────────────────────────────────*
  *>            | 1301 STACKING / LAMINATION                  |
  *             *─────────────────────────────────────────────*
13013940            STACK TO SIZE
13013950            LAMINATE
  *             *─────────────────────────────────────────────*
  *>            | 1381 SERIALIZATION / SIZING             M4  |
  *             *─────────────────────────────────────────────*
13813900            SERIALIZE LAMINATE
13813980            SIZING/DEBURR

01 HELP     02 SELECT    03 QUIT  04         05
06 HISTORICAL COMPARE   07 BKWD  05 FWD  09 PRINT
10          11 LIST     12

INTERSITE LINE COMPARISON SYSTEM (SECURTIY CLASSIFICATION)   A01B

MOVE THE CURSOR TO THE ITEM YOU WISH TO SELECT AND PRESS PF2

NUMBER         M4 (F), M4/M5 (S) SUBSTRATE MFG (TECHNOLOGY B)

```
22316000       BSM DEBRIS REMOVAL BEAM
22316010       BSM DEBRIS REMOVAL INSPECT
22316020       MASK ASSEMBLY
22316050       BSM INSPECT
22316050       PRE-CLEAN
22316070       FINAL CLEAN
*              *———————————————————————————————————*
*>             |  2241 TEST II (ATF)                    M4    |
*              *———————————————————————————————————*
22416100       ATF MAPPING
22416110       ATF STEP AND REPEAT COT
22416120       ATF STEP AND REPEAT POST
22416128       SPIN CLEAN
22416130       ATF CHARACTERIZATION
*              *———————————————————————————————————*
*>             |  2271 VIA APPLY                        M4    |
*              *———————————————————————————————————*
22716200       VIA IPA CLEAN
22716220       VIA APPLY
```

01 HELP    02 SELECT    03 QUIT   04        05
06 HISTORICAL COMPARE  07 BKWD  08 FWD 09 PRINT
10         11 LIST       12
====>

FIG. 9

INTERSITE LINE COMPARISON SYSTEM (SECURITY CLASSIFICATION)   A003
    22316000        BSM DEBRIS REMOVEL BEAM

| ITEMS | LOCATION 1 | LOCATION 2 |
|---|---|---|
| PROCESS ENGINEER | J. DOE | R. SCHMIDT |
|  | J. SMITH | G. SCHNEIT |
| MPS NUMBER(S) AND TITLE(S) | MPS-44-1056 MILLS BEAM PURGE | 0712637 BEAM MILL |
| CRITICAL PROCESS PARAMETER/CONTROLS |  |  |
|   TEMPERATURE | N/A |  |
|   PRESSURE | VAC.9X10 TO POWER (-6)TORR GAS PRESSURE 3.2X10 POWER (-4) BEAM VOLT.750+/-10 BEAM CURRENT 600+/-15M AMPS DISCHARGE VOLT. -55 TO -65 |  |

01 HELP    02        03 QUIT    04        05 COMPARE  06    07 BKWD
08 FWD    09 PRINT   10 DETAIL HISTORY    11       12 EXPLAIN

```
INTERSITE LINE COMPARISON SYSTEM (SECURITY CLASSIFICATION)     A050
    *>         2231 BSM DEBRIS REMOVAL BEAM
ITEMS              LOCATION 1                LOCATION 2
                   ──────────                ──────────

*** OPERATION 22316000 AND OPERATION 7910 ************************

PROCESS ENGINEER   J. DOE                    R. SCHMIDT
                   J. SMITH                  G. SCHNEIT

MPS NUMBER(S) AND  MPS-44-1066               0712637
TITLE(S)           MILLS BEAM PURGE          BEAM MILL

CRITICAL PROCESS
PARAMETER/CONTROLS
   TEMPERATURE     N/A
   PRESSURE        VAC.9X10 TO POWER (-6)TORR
                   GAS PRESSURE 3.2X10
                   POWER (-4)
                   BEAM VOLT.750+/-10
                   BEAM CURRENT 600+/-15M AMPS
                   DISCHARGE VOLT. -55 TO -65

01 HELP   02          03 QUIT   04       05        06
    07 BKWD   08 FWD      09 PRINT  10       11        12 EXPLAIN

====>                                  09        A: PORT 27 LU 29
SB*
```

FIG. 10A

INTERSITE LINE COMPARISON SYSTEM (SECURITY CLASSIFICATION)   A042

1016 P36
44-10666350905-30-89 MILLS BEAM PURGE
MPS 44-1066:63509 (05-30-89)              MILLS BEAM PURGE

TABLE OF CONTENTS 1.0  SUMMARY 2.0  PROCEDURES 3.0  SETUP 4.0  OPERATION
4.1  REWORK CRITERIA 5.0  EMERGENCY SHUTDOWN
5.1  NORMAL SHUTDOWN 6.0  SPECIAL INSTRUCTIONS
6.1  WEEKLY CALIBRATION
6.2  MAINTENANCE CALIBRATION
6.3  NEW GRID CALIBRATION

01 HELP    03 QUIT     07 BKWD   08 FWD         12 EXPLAIN

```
INTERSITE LINE COMPARISON SYSTEM (SECURITY CLASSIFICATION)    A008
MOVE THE CURSOR TO THE ITEM YOU WISH TO SELECT AND PRESS PF2
DETAILS HISTORY M4 (F), M4/M5 (S) SUBSTRATE MFG (TECHNOLOGY B)
=== 22316000 HDETAIL APPENDED AT 19:11:16 ON 88/12/02 GMT (BY DOE
=== 22316000 HDETAIL APPENDED AT 19:14:12 ON 88/12/06 GMT (BY SMI
=== 22316000 HDETAIL APPENDED AT 21:42:33 ON 89/01/09 GMT (BY SMI
=== 22316000 HDETAIL APPENDED AT 16:50:55 ON 89/01/22 GMT (BY DOE
=== 22316000 HDETAIL APPENDED AT 16:52:42 ON 89/01/22 GMT (BY DOE
=== 22316000 HDETAIL APPENDED AT 13:29:11 ON 89/07/10 GMT (BY SIM
01 HELP   02 SELECT    03 QUIT     04
05 COMPARE ANY TWO DATES   05 COMPARE TO PREVIOUS
07 BACKWARD   08 FORWARD
====>
```

FIG. 12

```
MLC DETAILS HISTORY         (SEE CLASS)              A010
----- 22316000 HDETAIL APPENDED AT  19:14:12 ON 88/12/06 GMT
      (BY OBMANR AT FSHVMO

ITEMS                        FISHKILL
PROCESS ENGINEER             J. DOE
EQUIPMENT ENGINEER           E. GEHER
TOOL NAME                    BEAM MILLING TOOL
                             ACME MILL TOOL

NUMBER OF TOOLS:             VEECO
  PRESENT                    4
  ULTIMATE                   5
  ULTIMATE DATE              2.Q. 89
                             ACME
                             0
                             4
01 HELP  02          03 QUIT     04         05
06          07 BACKWARD 08 FORWARD           09 PRINT
====>
SB*                                      A: PORT 27 LU 29
```

FIG. 12A

```
INTERSITE LINE COMPARISON SYSTEM (SECURITY CLASSIFICATION)    A01B

MOVE THE CURSOR TO THE ITEM YOU WISH TO SELECT AND PRESS PF2

NUMBER      LOCATION 5 PROCESS FLOW
___         _____
*           *——————————————————————————————————————*
*>          | 0 26 POD FUSION PRECLEAN    F. HOWARD |
*           *——————————————————————————————————————*
1001        I O U
1002        CLEAN 1
1003        DHF DIP
1004        A/B CLEAN 2
1005             -STEP A
1006             -STEP B
1007        CLEAN 1
1008        R E W O R K
1009        REWORK STEP A, B
1010        INSPECTION
*           *——————————————————————————————————————*
*>          | 0 27 POD FUSION             G. PHILLIP |

01 HELP   02 SELECT   03 QUIT   04 GROUPS    05 SECTORS
06 HISTORICAL COMPARES   07 BKWD    08 FWD   09 PRINT
10      11 LIST    12 QUIT
====>
SB*                              09      A: PORT 27 LU 29
```

FIG. 13

```
INTERSITE LINE COMPARISON SYSTEM (SECURITY CLASSIFICATION)        A003
       1001      I O U
ITEMS  __  __  __  __   LOCATION 5  __  __  __  __   LOCATION 2  __

* * * TOP OF FILE * * *

RESPONSIBLE:           SMITH                    OTTO
TOOL:                  FSI                      FSI
BATCHSIZE:             50 WOOFERS               50 WOOFERS

* * * END OF FILE * * *

01 HELP    02         03 QUIT    04         05 COMPARE
06         07 BKWD    08 FWD     09 PRINT   10 DETAIL HISTORY
11         12

====>
SB*                                  09      A: PORT 27 LU 29
```

FIG. 14

```
INTERSITE LINE COMPARISON SYSTEM (SECURITY CLASSIFICATION)    A047
MOVE THE CURSOR TO THE ITEM YOU WISH TO SELECT AND PRESS PF2
__ __ __ __ __ __ __ __ __ __ __ __ __ __ __ __ __ __ __ __ __ __

COLD PROCESS, TYPE "K".
FILM PROCESS, TYPE "F".
F PROCESS, TYPE "P".
TERMINAL ORGANICS, TYPE "T".

01 HELP   02 SELECT   03 QUIT   04      05      06       07 BKWD
08 FWD    09          10        11 LIST  12

====>
SB*                                  09      A: PORT 27 LU 29
```

FIG. 15

```
INTERSITE LINE COMPARISON SYSTEM (SECURITY CLASSIFICATION)    A054
MARK SECTORS TO DISPLAY WITH "PF2" AND PRESS PF 4 WHEN FINISHED
NUMBER      LOCATION 5 PROCESS FLOW

0            |   0 265 POD FUSION PRECLEAN            F. HOWARD   |
1 *>         |   0 270 PAD FUSION                     G. PHILLIP  |

01 HELP    02 SELECT   03 QUIT     04 PROCESS     05             06
07 BKWD    08 FWD      09 PRINT    10             11             12

====>
SB*                              09              A: PORT 27 LU 29
```

FIG. 16

```
INTERSITE LINE COMPARISON SYSTEM (SECURITY CLASSIFICATION)    A054
MARK SECTORS TO DISPLAY WITH "PF2" AND PRESS PF4 WHEN FINISHED
NUMBER      LOCATION 5 PROCESS FLOW

0
----> *>    |    0265 POD FUSION PRECLEAN           F. HOWARD   |
----> *>    |    0270 PAD FUSION                    G. PHILLIP  |
    3

01 HELP    02 SELECT    03 QUIT     04 PROCESS    05
06         07 BKWD      08 FWD      09 PRINT      10
11         12
====>
SB*                              09              A: PORT 27 LU 29
```

FIG. 17

```
INTERSITE LINE COMPARISON SYSTEM (SECURITY CLASSIFICATION)   A050
       DISPLAYING SELECTED SECTORS - ALL OPERATIONS
  ITEMS                   LOCATION 5              LOCATION 2

* * * TOP OF FILE * * *
  ** SECTOR 0 ==> POD FUSION PRECLEAN         F. HOWARD

*******************>>   1001 I 0 U               1001 I 0 U

RESPONSIBLE:            F. HOWARD                OTTO
  TOOL:                   FSI                      FSI
  BATCHSIZE:              50 WOOFERS               50 WOOFERS

*******************>>   1002 CLEAN 1             1002 CLEAN 1

RESPONSIBLE:            F. HOWARD                OTTO
  MEDIUM:                 STICKS                   STONES
  TEMP:                   65 C                     104 -- 5 C
  TIME:                   2 MIN                    20 MIN

01 HELP    02         03 QUIT    04      05      06 PROBLEMS    07 BKWD
  08 FDW     09 PRINT   10         11      12
  ====>
  SB*                                09              A: PORT 27 LU 29
```

FIG. 18

```
INTERSITE LINE COMPARISON SYSTEM (SECURITY CLASSIFICATION)    A057
     PROCESS-NAME
CHOOSE ONE OF THE FOLLOWING:
PF1  HELP
PF3  RETURN
PF4  MAJOR PROBLEMS - OPEN
PF5  MAJOR PROBLEMS - CLOSED
PF6  MINOR PROBLEMS
PF7  NEW PROBLEMS

====>
SB*                              09            A: PORT 27 LU 29
```

FIG. 19

```
INTERSITE LINE COMPARISON SYSTEM (SECURITY CLASSIFICATION)   A053
     HOT PROCESS, TYPE "H".

ITEMS             LOCATION 5              LOCATION 2

**********>>     XXXX NO DESCRIPTION      100A TEST OPERATION

RESPONSIBLE:                              R.PRUITT
TOOL:                                     TENT 5000
SPEC:                                     ADDER < 13 PART
SENSITIVITY:                              > 0.5 UM
FREQUENCY:                                MIN. ONCE/DAY
SAMPLE:                                   3 WOOFERS/BATCH

01 HELP   03 QUIT   04 UP 1   05 DOWN 1   06 PROBLEMS
07 BKWD   08 FWD    09 PRINT
====>
SB*                              09            A: PORT 27 LU 29
```

FIG. 20

DATABASE SYSTEM FOR FACILITATING COMPARISON OF RELATED INFORMATION STORED IN A DISTRIBUTED RESOURCE

BACKGROUND OF THE INVENTION

1. Field of the Invention

The present invention generally relates to data processing systems and, more particularly, to systems for utilizing data from a plurality of data stores in a distributed data base.

2. Description of the Prior Art

Since the development of stored-program, general purpose digital computers and the development of complex programs for processing large amounts of data and management of large databases, a general goal of the function of such machines has been to increase the availability of information to a user in a manner in which the operation of the machine to obtain the desired data does not detract from the assimilation of the data by the operator. The achievement of this goal has been complicated by the many programs which have been developed to efficiently capture, store, retrieve and process particular types of data. For instance, alpha-numeric data is typically handled on a character-by-character basis since a code of limited length is sufficient to specify virtually any character in use in the language of any culture. In contrast, graphic or pictorial data must be captured, stored, retrieved and processed in a manner which will allow reproduction at a high degree of resolution, thus requiring much more data to correspond to the space which might be otherwise occupied by an alphanumeric character. Further, even rudimentary operations on graphic data, such as positioning of an image is largely incompatible with the existence of text syntax and predetermined character positions within a document or in a screen image.

Even alphanumeric data, alone, can present formidable problems of form and context when it must be operated upon efficiently by different applications (e.g. programs). For instance, a word processor will generally articulate data in text strings whereas database programs will provide for capture, storage and retrieval of data based on screens containing fields which are used to categorize data and thus avoid storage of a repeated set of identifiers with the data. Spreadsheets require yet a different format for efficient data storage and processing.

The above types of differences and others, which are necessary to the efficient operation of particular applications limit the efficiency with which data can be shared between those applications. While some conversion programs exist, they are time-consuming and, for that reason, are seldom invoked automatically other than for conversion of text files to the format required for a particular, running, word processor program where the need for such conversion can be assumed upon the command for retrieval of the file.

Consider now, the problem presented by the use of computers to present and manage the large amount of data necessary to monitor a complex operation such as the operation of a manufacturing assembly line. Cost, price and profit projections will typically be handled by a spreadsheet type of program. Design information will be handled by text and graphics applications. Correspondence and documentation will be handled in text files. Procurement data and invoices may be handled as both text files and database screens. Testing, quality control, production and similar types of reports may involve all of the above types of data. It can be readily understood that even with existing forms of machine managers, where a plurality of applications can be more easily invoked from menus and so-called window programs which facilitate multi-processing (e.g. simultaneous running of a plurality of programs between which the user can switch), the necessary data for the efficient management of a manufacturing assembly line or the like is not optimally available. Neither can all possible desired combinations of data be made simultaneously available to a user from different applications, each of which is specific to the reporting of only some of the desired data, without large amounts of processing time for data conversion.

In recent years, both economic and political considerations have led to a trend among manufacturers to produce similar or identical products at different, widely separated locations. Such a plurality of manufacturing lines must be optimally managed, just as single manufacturing lines must be, but with the additional requirement that the resulting products must be absolutely uniform (including quality standards) completely interchangeable and produced at approximately the same cost. In cost considerations, materials procurement, labor costs and availability, distribution costs and design must be continually compared between sites in order to maximize the efficiency of the combination of manufacturing lines and overall cost-effectiveness of the manufacturing effort for the company.

In the past, such communications have been done in forms which increase the number of types of data which must be assimilated by the data processor. In addition to the types of computer database information which could be exchanged electronically and which still results in difficulties of processing and communication to the computer user, the exchange of design and manufacturing data between sites was often done in hard copy form, possibly enhanced by facsimile transmission and image data capture technology. Nevertheless, particularly in matters of automated testing, data was often reduced to hard copy form, transmitted by facsimile, courier or mail and then locally entered on a local database. At least in part, this manual data entry constituted a form of data conversion to enable the more rapid accessing of the data by the different applications which were called upon to process the same. However, such forms of data transmission and recapture in machine usable form caused irregular delays and made them subject to human error. Aside from introducing a reliability factor into the data which might result in inconsistent evaluations of the same initial information, irregular delays are particularly deleterious to efficient management of a plurality of manufacturing lines since current data, derived locally, might be compared with obsolete data from another location, leading to incorrect management decisions.

In addition to the above-noted difficulties presented by different types of data which must be pulled together and coordinated to allow a meaningful comparison between manufacturing lines or other business endeavors, it must be realized that it is unlikely that two manufacturing lines, even if arranged to produce identical products, will be identical and exhibit a one-to-one correspondence between operations. Therefore, in addition to amassing data reflecting the operation of the manufacturing lines, the manager at each site must continually determine the portions of the lines which are sufficiently equivalent to allow comparison and what adjustments in data may be necessary for a meaningful comparison to be made. Thus, in the past, such equivalency determinations were subject to human judgement and might be inconsistent between sites.

Further, it is difficult to accomplish the timely transmittal of necessary information consistent with the maintaining of the desired degree of security since either transcription of data and electronic transmission of data may require particular measures to be taken in regard to such data transmittal. For instance, scrambling or encryption may De necessary for electronic transmission, depending on the degree of security required. By the same token, the use of couriers and personnel with special clearances for data transcription may result in additional delays.

It should be understood that while these considerations and the problems which can result are particularly acute in manufacturing processes, the same considerations and problems exist in many fields of endeavor, such as in architecture, insurance, banking, transportation and the like which are subject to both economic and geographical influences. Therefore, although the invention will be described in terms of geographically distributed manufacturing lines, the applicability of the invention is not so limited and should be considered applicable to any other geographically distributed business endeavor.

SUMMARY OF THE INVENTION

It is therefore an object of the present invention to provide access to information used in the management of manufacturing lines or other business endeavors no matter how widely separated geographically.

It is another object of the invention to provide for comparison in real time of data from all sites of a business endeavor at any single site thereof and to accommodate different forms of transmission and different levels of access to maintain system security and integrity.

It is a further object of the invention to provide for comparison of data between sites and from the selective point of view of any site based on a uniform concordance of equivalent data, regardless of the identity of individual operations at any site.

It is yet another object of the invention to provide for the automatic and user-transparent access to data in a plurality of applications and in a plurality of forms and formats for presentation in a user-definable format for rapid assimilation thereof.

In order to satisfy the above and other objects of the invention, a system is provided for comparing data from at least two data sources including a node of a network receiving data from at least one data source and a shadow of data from another data source, means for displaying a menu of functions and selecting a function therefrom, means responsive a selection from the menu for invoking at least one application at the node and reporting data through the application, and selectively displaying the data reported.

In accordance with another aspect of the invention, a method of data retrieval is provided including the steps of storing a concordance of equivalent data items included in data from at least a first source and a second source, retrieving selected data items corresponding to said first source from a memory, and retrieving equivalent data items corresponding to said selected data items from said second source from said memory in response to said concordance.

In accordance with a further aspect of the invention, a method of data retrieval is provided in a system, including the steps of comparing a list of data items and a conversion table to detect predetermined types of differences between the list of data items and the conversion table, and listing data items detected by the comparing step.

In accordance with a yet further aspect of the invention, a method of data retrieval from a virtual machine system including a distributed resource, said virtual machine system having a plurality of nodes, each said node including a plurality of applications and local storage is provided comprising the steps of storing selected data items from the distributed resource in local storage including updating the local storage when one of a plurality of predetermined files of the distributed resource is altered, displaying a menu of predetermined data reporting options, selecting a data reporting option from said menu, invoking at least one application in response to selection of a data reporting option and selecting data from the local storage in response to selection of a data reporting option, selecting further data from local storage in response to the selection of data from said local storage under control of a concordance of data items, and reporting the data and the further data in a predetermined format corresponding to selection of a data reporting option from the menu.

BRIEF DESCRIPTION OF THE DRAWINGS

The foregoing and other objects, aspects and advantages will be better understood from the following detailed description of a preferred embodiment of the invention with reference to the drawings, in which:

FIGS. 4 and 5 are screens illustrating the main menu of a preferred form of the invention, FIG. 6 is a data comparison format menu according to the invention, FIGS. 7 and 8 are two exemplary screens which may be reached from the menu of FIG. 6, FIGS. 9, 10, 10a, 11, 12 and 12a are further exemplary screens useful in understanding the operation of the invention, and FIGS. 13, 14, 15, 16, 17, 18, 19 and 20 are alternative screens which are exemplary of other screens which may be used at particular locations of the ILC system.

DETAILED DESCRIPTION OF A PREFERRED EMBODIMENT OF THE INVENTION

Figure 1:
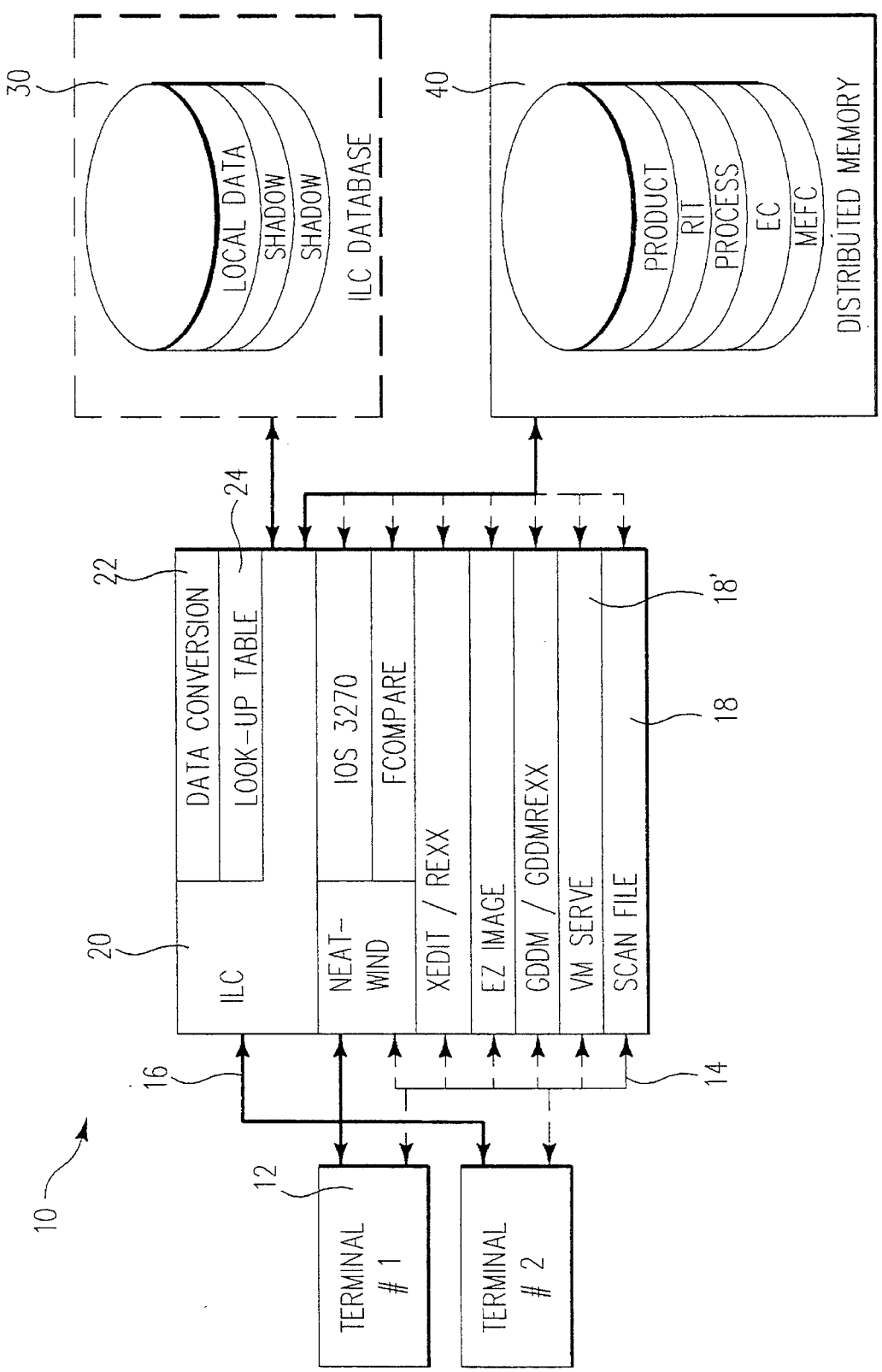
FIG. 1 is a schematic diagram of the intersite line comparison system (ILC) according to the present invention in combination with an existing virtual machine (VM) system.

Referring now to the drawings, and more particularly to FIG. 1, there is shown, in schematic form, the architecture of the present invention in relation to an existing system. The invention is preferably implemented in connection with a virtual machine (VM) system including a network as generally indicated by a distributed resource. This distributed resource typically comprises storage which is distributed through a plurality of nodes of the system. In a manner well-understood in the art, each node can send all or a portion of the storage at that node to another node where a shadow of that data can be held for rapid access. The shadow data can be updated as desired under control of either the owner node or the node where the shadow exists. Therefore, the VM system can make each user terminal appear to contain the entire contents of the distributed resource.

In existing virtual machine systems, the user may invoke any one of a plurality of applications, as desired, which may be available locally or imported over the network. As illustrated, these applications may include but are not limited to such applications as VMSERVE—service machine
VMSERVEX—service machine
SCANFILE—used for searches
XEDIT—screen manager and macros
REXX—a programming language used in the invention
IOS3270—an input/output program
NEATWIND—a screen manager for producing windows
GDDM—used for graphics
GDDMREXX—a graphics interface for REXX
EZIMAGE—an image presentation controller
FCOMPARE—a comparison program
TOOLSRUN—service machine for updating ILC databases
TOOLCARE—used for synchronization of databases.

In a VM system, any one or more of these applications may be manually or automatically invoked by a user and, when invoked, interact with the distributed resource as shown by dotted lines in FIG. 1. A menu could be used for this purpose within the level of ordinary skill in the art.

The Intersite Line Comparison (ILC) system 10, according to the invention, also uses menus but, in contrast to the prior art, uses menus to select particular predetermined functions which may, in turn, automatically invoke one or more of the noted applications, or other applications which may be provided or available, and thus interact with them to provide enhancements thereof and cause them to automatically act in combination in some selected instances. Therefore, the ILC system, according to the invention operates much in the fashion of a separate program but operation is greatly simplified and improved in performance for the purpose of data comparison by the ability to utilize existing applications which are effectively contained within the ILC. By automatically invoking one or more applications and interaction with these applications, which, in turn, interact with the distributed resource, the ILC can retrieve data in many predetermined and useful forms from a combination of the applications available. The ILC system can thus provide ready access to data in a much simplified and user-friendly manner.

More specifically, according to a preferred form of the invention, the following functions are supported:

1.) Selecting any two sites from a list of sites and making a comparison of the process flows of each site. A process flow consists of a sequential list of operations and sectors. An operation is a manufacturing step used to produce a product and a sector is a grouping of logically related operations. The process flow comparison can compare identical operations in each process flow. The process flow comparison can also compare groups of sectors and operations from each process flow that accomplish the same objective. The number of sectors and operations from one process flow need not be the same as the number of sectors and operations of any other process flow. The sectors and operations between process flows need not be the same as or otherwise identified with the sectors and operations of any other process flow in any rigid or explicit manner.

2.) Selecting any two sites from a list of sites and making a comparison by individual sector or a dynamically defined group of sectors to provide a comparison of substantially like items lined up side-by-side.

3.) Selecting any two sites from a list of sites and making a detailed side-by-side comparison of values from the two sites for a particular list of items that describe an operation.

4.) Selecting any two sites from a list of sites and making a dynamic comparison of a predetermined, logically defined group of sectors with values of like items in a predefined format.

5.) Selecting any two sites from a list of sites and making a comparison of only values for operations in which a problem has been detected or otherwise indicated, based upon variance of operations or sectors between sites. Characterizations of problems as open or resolved, major or minor and previously or newly detected or indicated can be discriminated.

6.) Comparisons can be made between historical data and may be for a single site at two points in time or any point in time when a change has occurred or a two site comparison taken at one or two points in time. Most unchanged data is suppressed to more clearly indicate changed data. Some unchanged data is displayed to provide a reference to the user.

7.) More general comparisons can be made between any of a plurality of sites where the data does not have like items or keys by specifying a category of data and altering the site selection to sequentially display values for each site even when there is no correlation between operations or sectors at certain sites, such as for production yield data for differing products.

Considering FIG. 1 in greater detail, a user at a terminal 12 at a node 10 of the VM system can invoke any desired application in the usual manner, as indicated by the dashed lines 14 of FIG. 1, or can invoke ILC directly, as indicated by solid lines 16, assuming appropriate access is granted. The preferred system of granting access to particular users is disclosed in detail in U.S. Pat. application Ser. No. 07/754,923, (IBM Docket No. FI9 -91-044) entitled FRONT END FOR FILE ACCESS CONTROL SYSTEM, filed concurrently herewith by the inventor named herein, and which is hereby fully incorporated by reference. The ILC responds with a plurality of menus, which can be simply produced as text screens (and which can be suitably limited in content to correspond to the access authorized to the user) from which the user can select a menu entry corresponding to the desired data and data presentation. The menu is preferably implemented in a selection hierarchy and the text screens will preferably contain instruction prompts as well as allowing resort to help screens.

A selection from an ILC menu will either call a further menu screen from a selection hierarchy or tree of such screens, as will be explained in greater detail below, or cause direct invocation of one or more of the applications, such as 18, 18', available on the system. The invocation of applications from the menu to provide enhancements of the applications, according to the invention, as well as the implementation of the menus may perhaps be best understood by detailing how such invocation of programs would be done according to a simple operating system such as DOS. In the text screen, each menu selection is provided with a unique number, although the same selection could be contained in a plurality of menu text screens. Each such unique number can then be used as the name of a batch file which will automatically execute upon the entry of the number. Cursor selection of a menu item can be done by using a cursor location input to look up a corresponding number from a look-up table. As is well-understood, the batch file thus called can be as simple or complex as desired to provide the desired function and can sequentially call a plurality of applications, call appropriate data conversion routine, provide for temporary storage of data in a file independent of the application so that it can be used by a subsequently invoked application or the ILC system, repeat the process, calling one or more other applications, format the data returned for communication to the user, and so forth, as desired, to correspond to any menu selection provided on the ILC system.

If desired, or appropriate, each of these "batch files" can be programmed in a manner which will be evident to those skilled in the art, in view of this disclosure, to provide for sequential execution of a plurality or sequence of menu selections. This would be done, for instance, where options would be provided for data presentation. In DOS, for example, it would be implemented by providing for display of a second text screen and PAUSE command at an appropriate point in a first "batch file" in order to allow calling of a second (or subsequent) "batch file" which would then return to the first batch file after execution. Such options can also be implemented in a hierarchical or nested manner.

It should be understood that the actual programming, while explained above in a simplified form for purposes of clarity, will depend upon the particular operating system used, such as UNIX™, AIX™, etc. and will be evident to those skilled in the art in view of the above description. It may also be helpful to conceptualize the menu selections as so-called "macro" subroutines which will dynamically build the data collection and screen presentation for the particular data comparisons desired. It should also be evident from the above description that the ILC system, by providing selective processing with one or more of the applications 18, 18' available on the system as well as additional processing as desired, including data conversion and screen formatting, provides a user-friendly, menu-driven system for access to virtually any combination of data available from the shared resource whether it is in the form of text, database screens, line drawings (e.g. CAD), graphics or pictorial data. This data is made available on-line by the ILC system and virtually immediate response is provided to the user as will now be explained.

Referring again to FIG. 1, it will be noted that the node 10 of the network illustrated accesses both the shared resource 40 and a portion of an ILC database 30. The entire ILC database is illustrated in more detail in FIG. 2. The database essentially comprises a plurality of sets 30, 30', 30" of mini-disks containing data preferably organized by subject matter for the purpose of facilitating implementation of security and user access to the ILC system, as disclosed in the above incorporated, concurrently filed application. The number of sets of mini-disks will be equal to the number of nodes participating in the ILC system and each node will access only one of the sets (e.g. 30, also shown in FIG. 1) of mini-disks containing its own data and shadows of data from other sites. It should be noted, in this regard, that not all nodes of the VM system need to participate in the ILC system or have the ILC system implemented thereon. In fact, in an implementation directed to management of a manufacturing assembly line, it is preferable that only the nodes at locations having manufacturing lines for similar or related products be participants in any single particular ILC implementation. By the same token, if the same VM system services locations where manufacturing lines exists for dissimilar products, each group of locations in which the manufacturing lines are for similar or related products can have a separately implemented ILC system within the same VM system.

Figure 2:
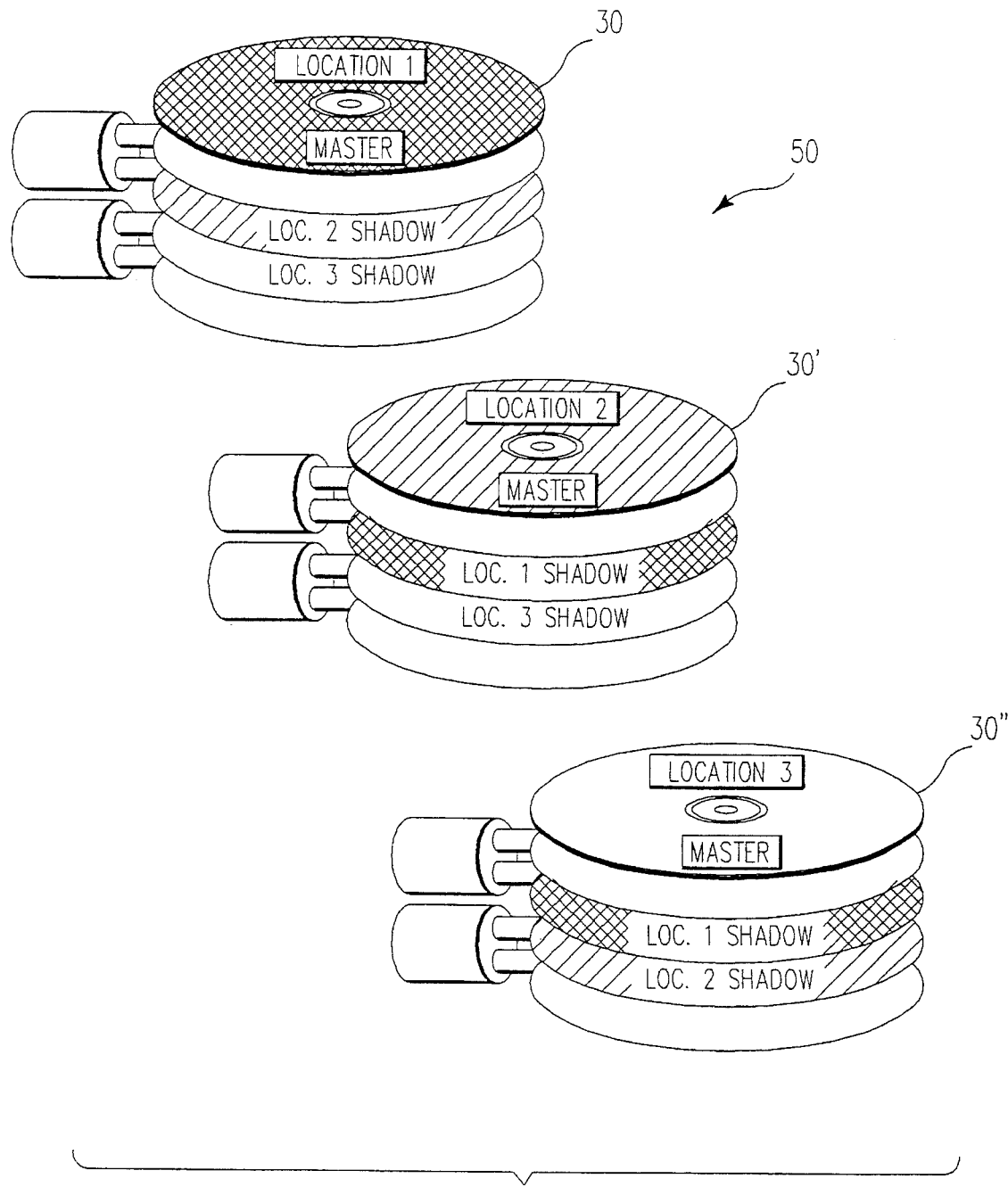
FIG. 2 is a schematic diagram of the database of the ILC system according to the present invention, FIGS. 3a, 3b, 3c, 3d, 3e, 3f, 3g, 3h, 3i, 3j and 3k, together, form a flow chart illustrative of the operation of the present invention.

The node illustrated in FIG. 1 will access only one of the sets of mini-disks which, as shown in FIG. 2, will contain all current data originating at that node which is to be accessed by the ILC system and shadows of similar data from the other nodes of the ILC system. Any node can, of course, write to its own files of the mini-disks but writing to the shadow files is not permitted. The shadow files may be periodically updated over the network from other nodes of the ILC system as may be desired. Preferably, updates to the shadow files are made immediately upon alteration of each corresponding file of the master file for that data (e.g. at the site where the data originates). It should also be noted that, since this communication to form the shadow files is largely independent of user access to the mini-disks, subject to priority and arbitration protocols which may be present in the system, different communication links with different security attributes can be easily implemented. Since the shadow files are available at any node only for read-only access, there is no danger of file corruption at any node and only the latest version of any file will be supplied to any user unless historical records are selected. Further, since read-only access need not be an exclusive access state, many users may obtain simultaneous access to the shadow files, allowing rapid system response. There is no need, therefore, to provide tags to the files to indicate alteration of a file, as is done in METHOD FOR MANAGING AN ELECTRONIC MAIL BASKET SERVICE (IBM Docket No. AT9-88-036) by Heyen et al.

It should also be appreciated that the ILC system, according to the invention, can accommodate any type of data and automatically provide appropriate conversions of groups of sectors and/or individual operations where necessary between applications. Conversion of data 22, as used by different applications can be provided, as well. As shown in FIG. 1, the data conversion to a standard language and format is supplemented by a look-up table 24 which contains a concordance between groups of operations or sectors at each site to thus group data in a predetermined fashion to facilitate comparisons between sites. In order to compare sectors and operations from one site to sectors and operations from another site, the data must be in ILC format and a conversion means, such as a look up table, must be provided. The conversion table identifies the groups of sectors and operations that perform essentially the same function and the operations from each site which are comparable between sites.

By the same token, the ILC system imposes no constraints on the operations to be compared at any site or the form in which data is collected, stored or manipulated in any particular application and essentially renders the various and possibly incompatible applications transparent to each other and to the user. It should also be noted that the number of mini-disks which may be utilized by the ILC system has no constraint imposed thereon by the ILC system, itself. Therefore, the number of mini-disks and the organization thereof is limited only by the hardware capacity of the system and can be organized in any manner consistent with the desired security and access authorization arrangements which may be provided. It has been found in practice that a reasonably small number of approximately thirty mini-disks is sufficient to satisfy practically all applications. Likewise, the ILC system is independent of the file access authorization system used. Preferably, however, file access is controlled by the known Resource Access Control Facility (RACF), implemented with a front end arrangement as disclosed in the above incorporated, concurrently filed application.

Also, it should be noted that the types and organizations of the data which can be returned to the user by the ILC system is extremely flexible and can be readily adapted to virtually any business process. As an example, according to a preferred implementation of the invention, for a manufacturing line such as for the manufacture of so-called Multilayer module (MLM) electronic circuits, particular applications will include

- Yield/loss reports
- Yield plans
- Loss codes
- Special projects reports
- Documentation
- Product Descriptions
- Cycle time reports
- M/E Family codes
- Unused chip site locations
- Process Chemicals
- Engineering Change Status reports
- CUSUM and/or SPC reports
- Product Handling Requirements
- T/F Process chemicals
- Distortion Measurement programs and
- DMIS-TF Measurement reports.

As can be seen, the appropriate data included in these applications is diverse and yet can be accommodated by the ILC system in accordance with the invention. For instance, while yield and loss reports may be typically in the form of database screens, as processed by the application, product descriptions, documentation and reports of unused chip site locations are likely to contain text, line drawings and graphics data.

The operation of the invention will now be described with reference to a plurality of exemplary screens utilized in a preferred embodiment thereof to provide a detailed understanding of the ILC system. In FIGS. 3a–3k, there is shown a flow chart illustrating an exemplary form of the operation of the ILC system according to the invention. FIGS. 3a–3k will be referred to for context in the following description of preferred forms of display screens shown in FIGS. 4–12.

In FIG. 4, an initial screen of the ILC system is shown. The first line of the screen identifies the ILC system which has been invoked and is currently running. The first line of the screen also identifies the security level as "(SECURITY CLASSIFICATION)" A screen identification number appears at the upper right. Next, below the first line, is a header space which provides an instructional prompt to the user. Specifically, the user is prompted to enter a number corresponding to a site number and, optionally, a second site number. A cursor can preferably be made to follow the blank spaces at the right side of each corresponding line of instructions as a further prompt to the user. Preferably, these categories and corresponding instructions are provided within the text of the menu in text lines bounded by asterisks. Also, preferably, the instructions and selections will be provided with different color attributes which, incidentally, can be used to control the cursor image and limit selections by cursor to specific permitted selections. Color attributes may also be used as a security key to limit the contents of the display in a manner which is well-understood. If the first two selection steps were to be implemented in the DOS batch file example referred to above or macro, the batch file or macro would merely direct storage at a particular location which can be accessed by a subsequent routine.

Figure 3A:
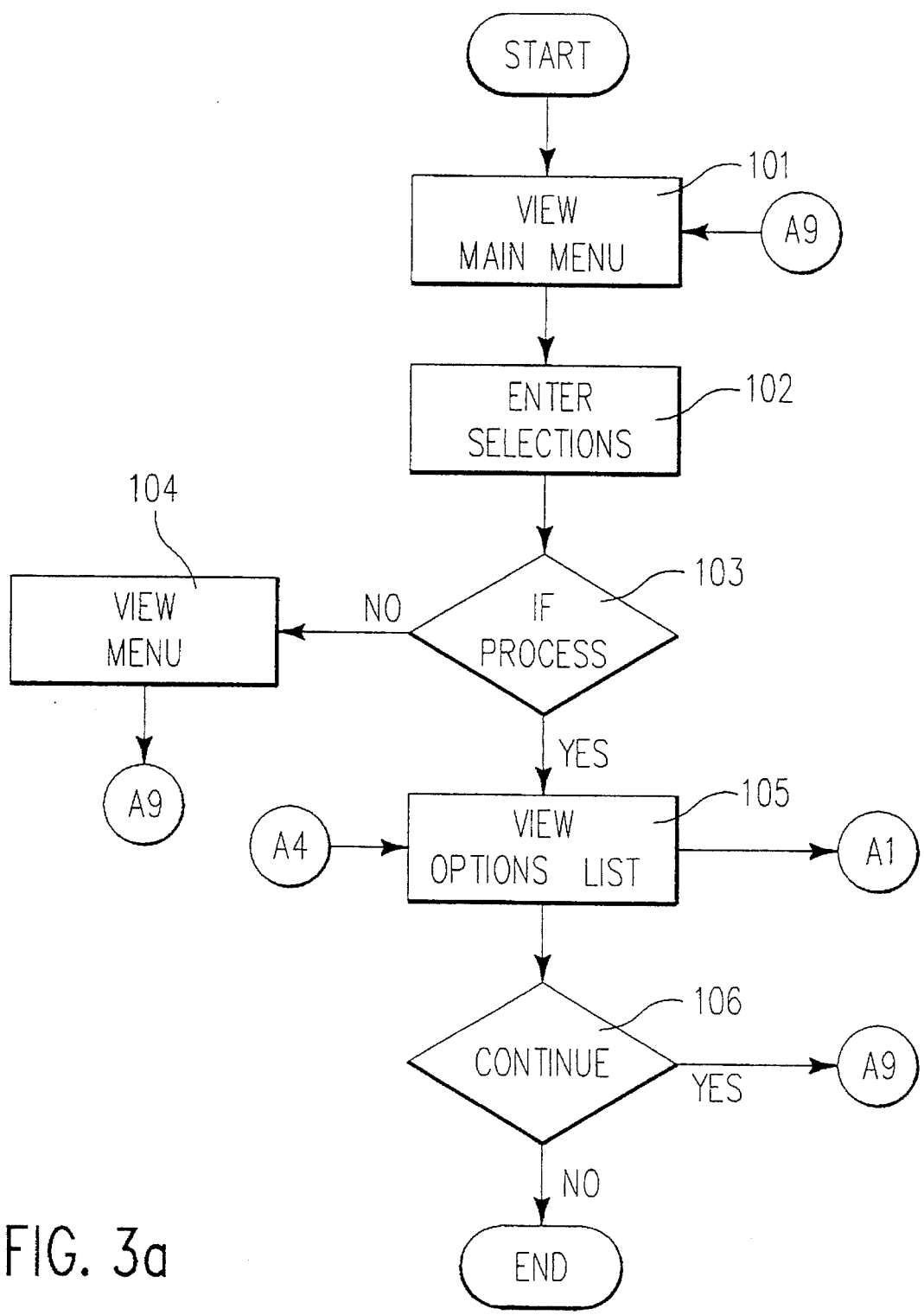

In FIG. 3a, an initial portion of the ILC system is shown. When the ILC system is invoked, as can be done from any terminal of the system, a main menu (screen A00, FIG. 4) is displayed on the terminal screen, as shown at 101. This provides an initial process where the user enters the selection of one or two sites and an item on screen A00. The menu asks the user to indicate a site, and optionally indicate a second site if a comparison is desired. An item must also be selected that is to be displayed or displayed and compared. An item refers to an item of data such as those listed under categories of yield/loss reports, process-flows, documentation, etc., as shown in the lower portion of screen A00, illustrated in FIG. 4. Any number of sites may be included on this screen as well as any number of items. If the number of sites and items exceed the number of lines on the physical terminal, the menu can be provided on a plurality of similar, sequential screens or scrolled. The user then makes selections which are entered 102 into the system. Following the entry of the identity of one or two sites for data retrieval, the third line of the header of screen A00 instructs the user to select a particular item by number. This is also preferably entered into memory in the same manner as the site desired. Note that the second instruction line contains the text "(For More Items Press PF8)", informing the user of the identity of a key which will bring up a second page of the same menu as a text screen, shown in FIG. 5. The items which can be selected are preferably grouped into categories under headings which are preferably displayed in a further color. The items, themselves, may preferably include parenthetical indications of the data available (e.g. for yield and loss reports, two types of reports are available but neither will reflect data from "Location 3", which, for the sake of example, is assumed to be in the early stages of implementation of the ILC system. Similarly, the text screen menu indicates that yield comparisons are not available from "Location 4" and other data may only be available from single sites.

The numbers assigned to the location portion and the option portion of the menu selections need only be unique within each portion of the menu. Duplication of numbers between the location portion and the option portion is therefore possible and the necessity of unique numbers within the option portion does not impose a constraint upon the alphanumeric designation of the locations. If it is desired that menu selection numbers be duplicated, differentiation can be accomplished based on a menu portion. Alternately, an alphabetic entry (e.g. first letter of a location name, an acronym or text, such as the location name, itself) can be used.

Finally on the last line of the text screen, keys are defined for help screens, quitting the program or advancing forward or backward through each ILC menu. Since this line is consistent or only slightly modified, regardless of the text screen displayed, it will preferably be displayed in yet another color.

The items to be selected from the screen shown in FIG. 5 are preferably logically divided into process flow and non-process flow categories. The category is detected at decision block 103, which determines if the data item is a process flow consisting of operations and sectors which are groups of operations or other data which is not to be compared. If a non-process flow category is selected, the ILC system branches to 104. In this case a menu of data is presented which corresponds to the selected site and the indicated data item. Individual data items can be selected from this menu and displayed. Afterward, a return is made to the main menu via A9. If the selection had been a process flow, the ILC system branches to FIG. 5 and a menu of options will be shown as illustrated with screen A026, shown in FIG. 6. The site names corresponding to the selected site numbers on screen A00 will be indicated on this menu. If there had been only one site selected, then a comparison could not be done and a modification of screen A026 would be presented. This would consist of only line option 1 and line option 10. In this way, it is seen that the implementation of the ILC system may be an ongoing process which can grow to meet the needs of the line managers and others involved with the operation of the manufacturing lines.

Assuming, as shown in FIG. 4 or 5, that item 16 is selected (which is a process flow category item), a further menu at a different hierarchical level is displayed, as shown in FIG. 6. FIG. 6 contains a first line which continues to identify the ILC system and may indicates a higher or lower security level for the screen. A second line of instructions indicates the permitted user action and a further header line indicates the identity of the item selection previously made. It should be noted that this type of hierarchical menu display is, per se, well-known. However, in accordance with the invention, the menu options at this level of the hierarchy represent data presentation formats. For instance, in this case, the first two lines allow a single site's data to be displayed in the form of a process flow consisting of sectors and operations. If an optional second site had been selected on screen A00 (FIG. 4), then a single site's process flow would have ultimately displayed the second site's operations data. When an operation is selected from the process flow, ILC checks the conversion table 24 to see if there is a comparable operation or group of operations in the second site's process flow. If this is the case, each site's operational details are then displayed side-by-side.

The next two pairs of menu selections provide for display of data from two sites for comparison but also providing for formatting based on one site and containing comparable data for the other specified site. This "point-of-view" feature of the invention is implemented by reference to the concordance in the look-up table 24 or other storage arrangement and which may be developed in a manner which is unique to each node of the system. By reference to the concordance, the ILC at each node automatically groups and possibly adjusts data retrieved from that node's portion of the ILC database in order to provide for a comparison of substantially equivalent portions of the manufacturing line.

The following two lines display an operation cross-reference list from each site's point of view. This is a process flow that shows, next to each operation of that site, the comparable operation of the other site if that operation is comparable on a one-for-one basis. The next line displays a list of common operations that, although they have been indicated on the conversion table to be common operations, do not have the same titles. The different titles for each operation are listed. The next two lines show the operations from each site that are indicated in the process flow but have not been listed in the conversion table. This provides a way for an administrator of the system to keep the conversion tables updated. Finally, the last two lines provide for display of each site's unique history of the process flows.

The functions which may be selected by these three lines are achieved by accessing a data item list which will preferably exist in a conversion table and comparing the data items with the contents of the concordance of data items from other sites contained in the conversion table. Preferably, the equivalence of data items is initially done manually. If equivalence has been specified, the function of line 7 of FIG. 6 can be carried out by a process which merely compares the titles of items which have been specified to be equivalents; reporting discrepancies for correction. If the function of lines 8 or 9 is selected, the list of data items for either of the selected sites is checked to determine if an equivalent item for the other selected site has been specified to be an equivalent; reporting only those data items from the list corresponding to the selected, specified site where no equivalency has yet been specified at the other specified site.

In summary, the screen shown in FIG. 6 is used to lead to one of a plurality of other screens including the main menu, as shown by the branch at 106 to A9 of FIG. 3a. It should also be noted that the user can also return to the main menu from block 104 if a non-process flow category item selection had been made, as discussed above. However, the major features of the ILC system, itself, are directed to allowing the comparison of data between manufacturing sites or other geographically separated business enterprises. If, for instance, at 105 of FIG. 3a ("View Options List"), line 1 of the menu of FIG. 6 is selected, screen A01, shown in FIGS. 8 and 9 will be provided, whereas, if line 3 is selected, screen A036, shown in FIG. 7, will be provided, as will be discussed below with regard to FIG. 3b since this selection from the options list of FIG. 6 at 105 of FIG. 3a, leads the ILC system to A1 of FIG. 3b.

In FIG. 7, most of the screen attributes discussed above are provided and will not be further discussed. However, it is important to note, as mentioned above, that the keys identified in the last two lines of the screen provide keys for switching back and forth between sites (keys 02 and 04, preferably identifying "PF" keys), for panning right and left through the spreadsheet (keys 10 and 11) and for printing the report to provide a hard copy to the user (key 09).

Similarly in FIGS. 8 and 9, FIG. 9 (screen A01B) being a continuation of FIG. 8 (screen A01), options of a historical comparison (key 06) and list (key 11) are provided. This historical comparison is described below in connection with A14 of FIG. 3k.

Figure 3B:
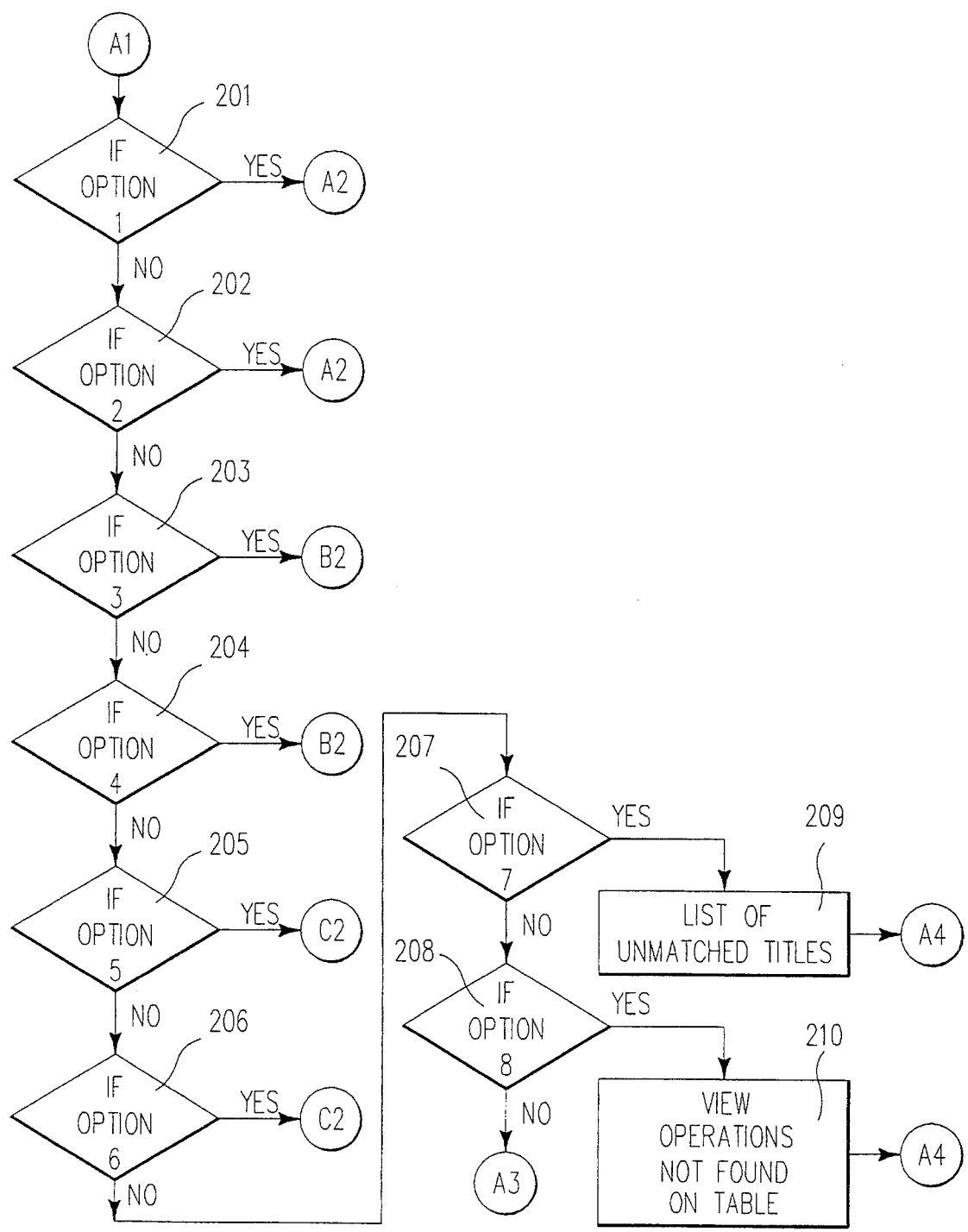
Figure 3C:
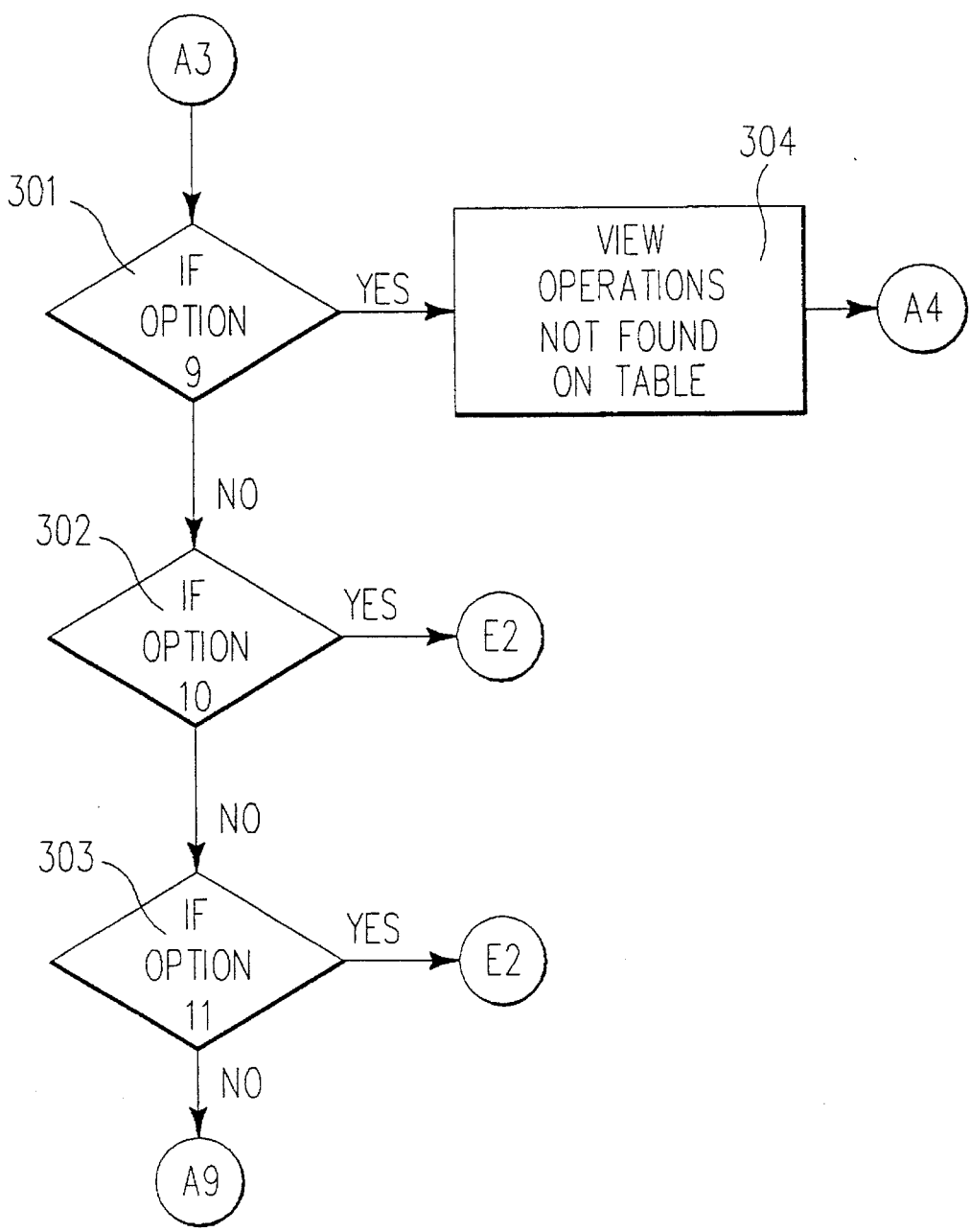

FIG. 3b, and FIG. 3c which follows, are a series of branching steps to test the selection made and cause branching to other parts of the ILC system. Specifically, the first decision block 201 selects location 1 or site one's process flow and operational details and causes a branch to A2 of FIG. 3d. A list of the indicated process flows available for display is presented, as shown at 401. This display, of which FIG. 8 is a preferable form, consists of sectors and operations. (A sector is a group of operations and is indicated on the screen with a "*>" beginning in column one. An operation is a manufacturing step required to make the product as shown in screen A01 of FIG. 8.)

It should be noted that all screens of the ILC system are not limited in size and further screens, such as FIG. 9 are provided. Scrolling or panning through data presented in either a horizontal or vertical direction or the presentation of sequential screens is also provided in a well-understood manner for all screens of the ILC system.

Figure 3D:
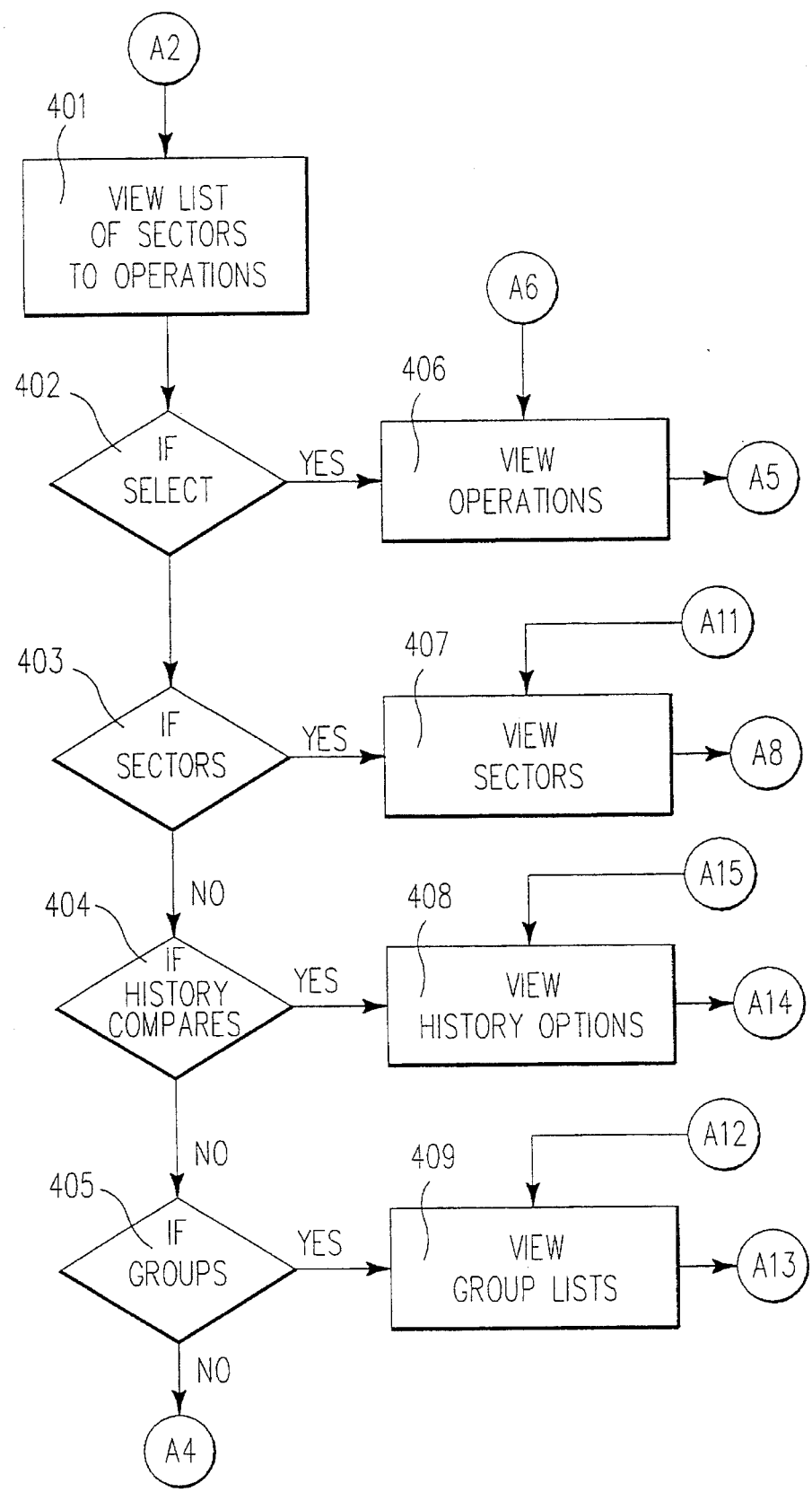

As further shown in FIG. 3d, a decision block 402 is provided to select a view of the operational details. If the user makes such a selection, the ILC system will branch to 406 which is the list of the detail operations. As shown in FIG. 10, screen A003 (FIG. 10) consists of a list of common data items on the left part of the screen. The middle part of the screen lists site one values for location 1 for those items. The right part of the screen lists the site two values for location 2 for those same data items. The list of data items is from a table of standard data items which can be added to or subtracted from. If there are no values for the data items, these items can be optionally suppressed. There can be different lists of data items for different kinds of process flows.

Figure 3E:
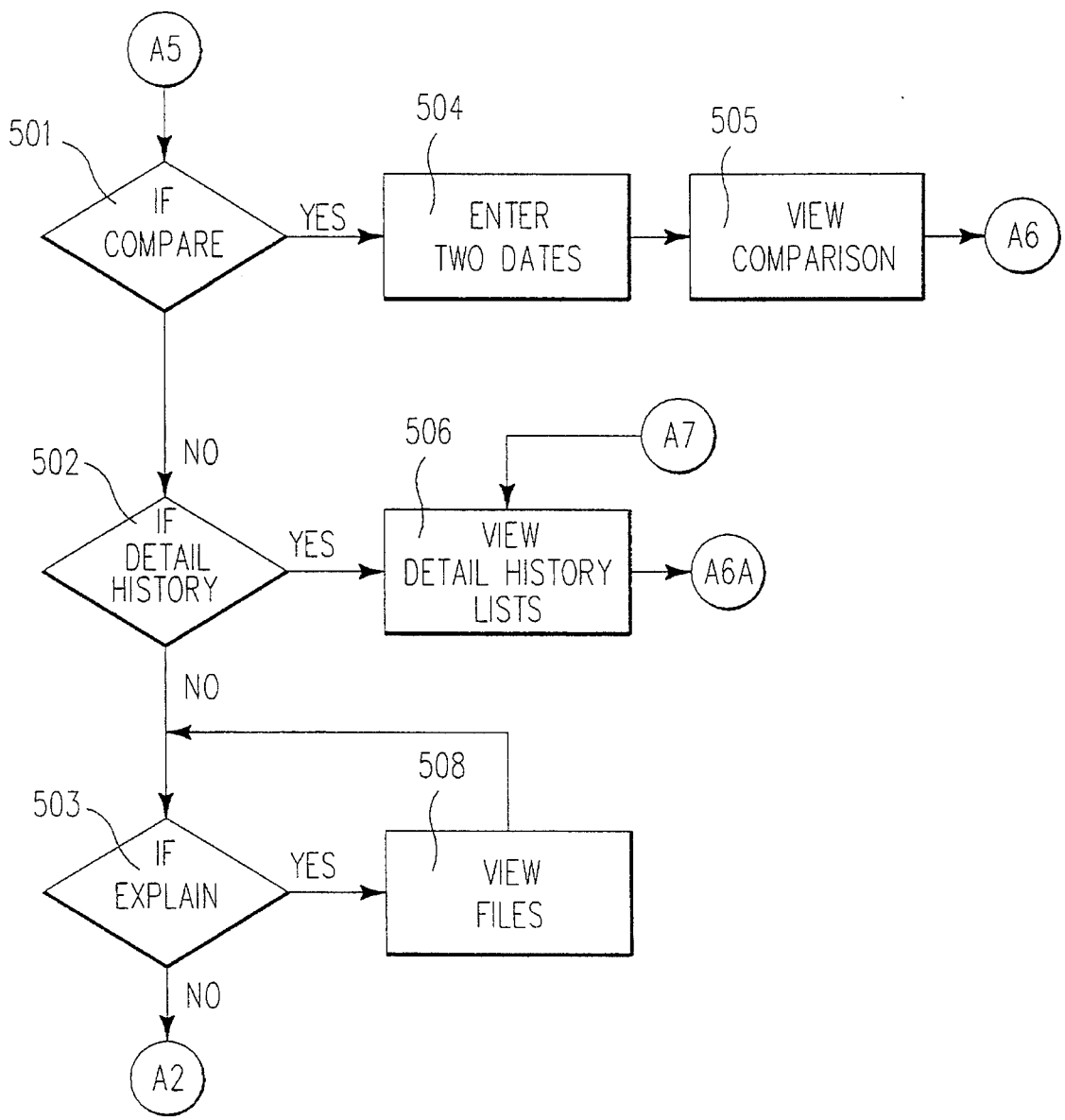

From screen A03 of FIG. 10, the user can make further selections which are sequentially tested and corresponding branches made as illustrated in FIG. 3e, beginning at A5. A decision block 501 selects a comparison of changes over time between the two sites at two points in time, which the user is prompted to enter at 504. Any two dates may be entered by the user corresponding to the dates on which the operations will be compared. This will cause production of a display to show the comparison for the indicated dates. A comparison will be made between site one and site two for the first date. Another comparison will be made between the two sites for the second date. The two comparisons will be displayed side-by-side with most identical lines not displayed and the changed, moved, deleted and inserted lines indicated. Once the user has viewed this data, the ILC system returns to the view operation of FIGS. 8 and 9 at 406 of FIG. 3d.

Figure 3F:
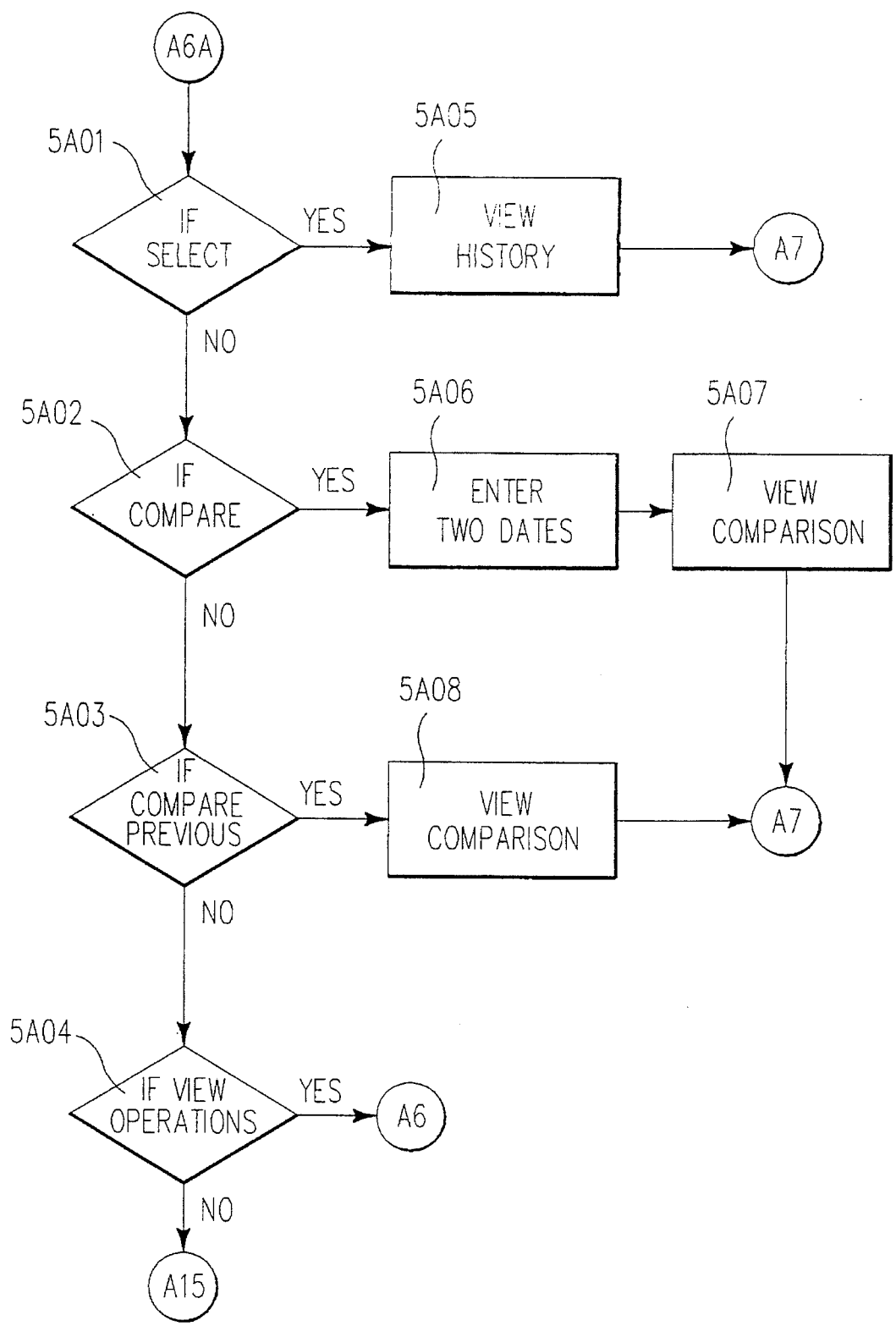

If the compare option was not selected at 501, the ILC system tests the selection to determine if a detail history option was selected at 502. If so, a list of available detail histories is displayed as indicated at 506. This display, preferably a menu of the detail history, is presented consisting of the data, time and user-ID of the person making the change, as shown in FIG. 12, illustrating screen A008. When a further selection is made, the further selection is tested and displays generated as shown in FIG. 3f, beginning at A6A.

Specifically, a decision block 5A01 is provided for selecting the operation at a point in time for site 1. A view of the history from a point in time consisting of the items and the values for the items for the selected site is provided as shown at 5A05. This is the list of the operational details. As shown in FIG. 12a, this screen consists of a list of common data items on the left part of the screen. The middle part of the screen lists site one values for location 1 for those items. The right part of the screen remains blank. After this is done, the ILC system returns to screen A008, shown in FIG. 12, from which further selections can be made.

If a history was not selected, as determined at 5A01, the selection is tested for a comparison selection at 5A02. This is a decision block for selecting a comparison of the operation from any two points in time for site 1. The user is then prompted to enter two dates at 5A06. When two dates have been entered for the historical comparison, a view of the returned data will be provided at 5A07. This will show the comparison for the indicated dates. Location 1 or site one's items and values for each date will be displayed side by side with most identical lines not displayed and the changed, moved, deleted and inserted lines indicated. Thereafter, the ILC system will return to 506 with a display of the detail history lists, as before.

If a selection of a comparison of any change listed in screen A008, FIG. 12, to the previous change is selected, a display of this data is provided at 5A08. This will show the comparison to the previous change on the list for location 1 (or site one's) items and values for each date will be displayed side by side with most identical lines not displayed and the changed, moved, deleted and inserted lines indicated. Afterward, the detail history lists are again displayed at 506, as before. Finally, if the selection was for the previous selection level, detected at 5A04, a return is made to the previous menu by branching to A6 and re-entering the view operations step 406 of FIG. 3d or to A15 and re-entering step 408 of FIG. 3d to view history options. The menu returned to will depend on the menu that the system came from. Earlier screens can be reached by default of branching at 501–503 of FIG. 3e which causes a return to A2 of FIG. 3d and the screens of FIGS. 8 or 9.

If the selection made from the screens of FIGS. 8 or 9, preferably by means of a cursor, is for sectors, a branch is executed at 403 to a screen showing a list of all of the sectors found in the process flow of sectors at operation 407. Options within this operation are shown in FIG. 3j, beginning at A8. The select sectors operation 901 allows selection from among all sectors that can be displayed. It should be noted for conciseness of explanation of the invention that if groups are selected (a group is a predefined list of sectors) and branching occurs at 405 of FIG. 3d, the operations of FIG. 3j will be entered at A13 and a similar list of groups will be displayed at 408 to allow a similar type of selection to be made at 902. After the selection, whether of sectors or groups, the following operations are carried out, albeit with different retrieved data corresponding to the selection of either sectors or groups. The following description of these operations, while expressed in terms of sectors is precisely the same as for groups, subsequent to a branch at 405 and display 409 of FIG. 3d.

After selection of a sector or a group, compared operations are displayed at 903 in the form of a list, illustrated in a preferred form in FIG. 10a. This list contains all of the operational details from the selected sectors or groups. It consists of a list of common data items on the left part of the screen. The middle part of the screen lists location 1 or site one's values for those items. The right part of the screen lists Location 2 or site two's values for those same data items. The list of data items is from a table of standard data items which can be added to or subtracted from. Following this display, the user can then specify additional detail which is displayed in response to a chain of branching operations 904, 906, 907 and 908 which serve to test the selection and retrieve the desired data. As noted above, the selection is preferably made numerically using programmable function keys such as PF1–PF12 keys generally provided on terminals. However, alternative or additional selection arrangements for selection can be easily provided. Specifically, the user can select major problems of either an open or closed type (open problems being in the process of resolution and closed problems having been previously resolved, minor problems and new problems with the manufacturing line or other business operation. These displays will also take the form of lists of items selected from the comparison items displayed at 903. Selection can be made by testing the actual variance against a predetermined variance figure, as between major and minor problems and for particular data or time of occurrence of a variance for closed problems and new problems, respectively. At the present time, selection and categorization of problems is preferably done manually by the setting of flags which define the category of problem. Thereafter, all data for which flags have been set will thereafter be automatically displayed in response to operator selection of problem category, such as from screen A057, illustrated in FIG. 19. All of these displays provide a return A10 to 903 for further selections. If no further selection is made, the system defaults to 909 which allows the user to return to the sectors menu or the group menu at A11 or A12 of FIG. 3d. This feature is particularly useful since it enhances comparability of data regardless of whether the data involves sectors or groups and effectively allows the operations of FIG. 3j to be re-entered and repeated, at will, beginning at either A8 or A13.

If, in the screen of FIGS. 8 or 9, a history compare function is selected, a branching operation occurs at 404, causing a display of history options 408. This display again is in the form of a list of the history options when viewing the process flow, from which the user can choose. The options consist of the following: 1.) comparison of the two sites at a single point in time for an individual operation, 2.) comparison of the two sites at two points in time for an individual operation, and 3.) detail history of the changes at site 1 for an individual operation. The following operations are illustrated in FIG. 3k, beginning at A14.

If the user specifies a data comparison for only a single date, a branch is carried out at 1001, the user is prompted to enter the desired date at 1004 and a comparison history is displayed at 1005. This is the list of the operational details. It consists of a list of common data items on the left part of the screen. The middle part of the screen lists location 1's or site one's values for those items. The right part of the screen lists location 2's or site two's values for those same data items. Similarly, if the user specifies a data comparison for two dates, a prompt for such information is made at 1006 and a display of differences between the comparisons is displayed at 1007. This will make a side by side comparison of the two sites at the point in time of the first date. It will also make a side by side comparison of the two sites at the point in time of the second date. The two comparisons will then be listed side by side to see if any changes have been made. Most of the unchanged lines will be suppressed for ease of reading and the lines that have been changed, moved, added or deleted will be indicated. After either of these displays, a return is made to A15 of FIG. 3d to allow retrieval of further historical comparison information.

If the user selects a detail history option, this selection is detected at 1003 and a branch is made to A7 of FIG. 3e, invoking operation 506 and the screen illustrated in FIG. 12 which can then be manipulated as described above with reference to FIG. 3f. Default of branching operations 1001–1003 causes return to the screen of FIG. 8 or 9 at A2 of FIG. 3d. If none of operations 402–405 cause branching and thus default, the system returns to the options list of FIG. 6 by re-entering operation 105 of FIG. 3a at A4.

Assuming the first line of the menu shown in FIG. 9 is selected as an example of the above operation of the invention, the screen shown in FIG. 10 will be produced, providing one or more pages of detail data. In this case the last two lines of the display contain key identifications for compare (key 05), detail history (key 10) and explain (key 12), corresponding to the branching operations 501, 502 and 503, respectively. If "explain" is selected after having moved the cursor to a document number, the screen of FIG. 11 is displayed at operation 508 to provide a table of contents of documentation available from the ILC system. Note that in the last line of this screen, further explanation is available. If "detail history" is selected the screen of FIG. 12 is produced by operation 506. This screen provides options of comparison of any two dates or a comparison to the previous historical record.

As shown in FIG. 3b, either of option 1 or option 2 will cause branching to A2 of FIG. 3d and the above described operations to be carried out. The only difference between these options, displayed on the screen illustrated in FIG. 6 is the site selected for data retrieval. Selection of option 202 will provide the same screens and options as decision block 201 except the data on the screens will be for the second site selected. In this example the data will be for location 2. All of the comparisons will be from location 2 or site two's point of view. The process flow will list location 2 or site two's process flow and any operation comparison will have location 2 or site two in the middle of the screen and location 1 or site one on the right of the screen. Of course, as many sites as participate in the ILC system and for which data exists should be provided for with a separate branching operation such as 201, 202 of FIG. 3b.

Figure 3G:
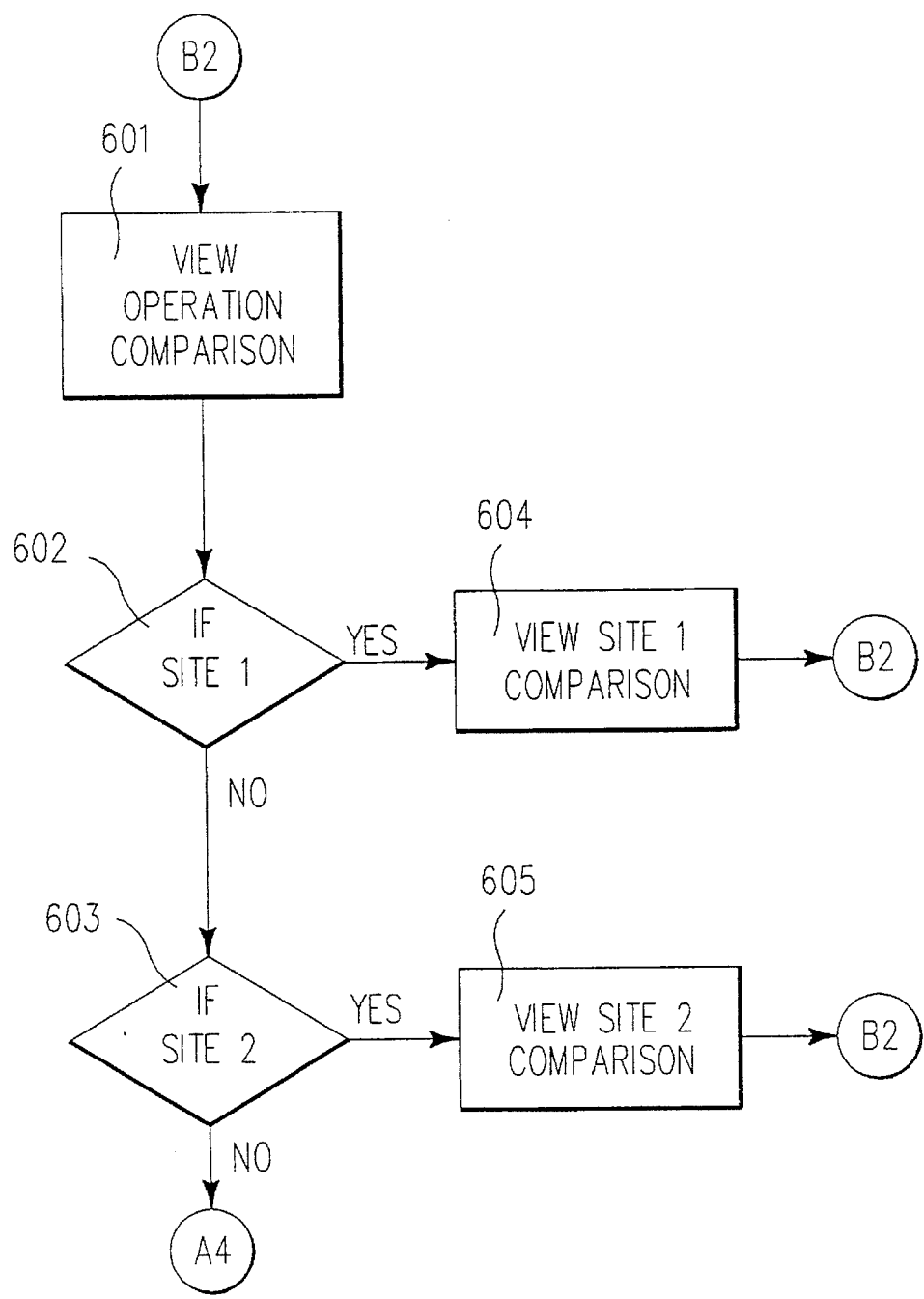

In a similar manner, if option 3 or option 4 is selected from the screen of FIG. 6, branching operations 203 or 204 of FIG. 3b will cause branching to B2 of FIG. 3g. In either case, similar operations will be carried out but with different data depending on whether 203 or 204 causes the branch to B2 of FIG. 3g. View operation comparison operation 601 corresponds to the "Line Cross Reference from Location 1's Point of View" in screen A036 illustrated in FIG. 7. In this option the process flow between the two sites, location 1 and location 2, is compared to indicate those sectors and operations between the two sites manufacturing lines are the same or similar and the cases when they are different. In the case where two sites produce the same product the manufacturing lines may not be entirely the same. It is an advantage to have each site's manufacturing lines as close to identical as possible. This allows economies of scale, reduced tool and equipment costs and a reduction in the cost of solving the problems associated with building and maintaining a manufacturing line.

The degree of difference may be more than simply having two lines with different number of operations. There are conditions where one site with two sectors and five operations may accomplish the same thing as another site with one sector and four operations. This is indicated on screen A036. Furthermore, parts of an operation from one site may be found in several operations on the second site. There is also the case where an operation is wholly and singularly duplicated in one operation from the second site. The mechanism that provides the information for displaying the comparison is the ILC conversion table. One conversion table is needed between each pair or set of sites that is to be compared. Screen A036 indicates groups of operations and sectors that accomplish the same manufactured output. The groups are indicated by dotted lines across the screen.

More specifically, the conversion table contains information concerning the equivalency of operations, sectors or groups thereof between sites with regard to process flow data. Thus, when the ILC system calls for particular data from one specified site, that call is used to access the conversion table to control retrieval of other data from another specified site and locally stored as shadow data which has been established as equivalent to the local data called by the ILC system.

Site selection is detected at branching operations 602 and 603 of FIG. 3g. If site 1 is selected, a screen A003, illustrated in FIG. 10 will be displayed containing a list of the operational details at that site and which consists of a list of common data items on the left part of the screen. The middle part of the screen lists location 1 or site one's values for those items. If there is an operation that compares on a one-for-one basis from location 2, then the right part of the screen lists location 2's or site two's values for those same data items. The list of data items is from a table of standard data items which can be added to or subtracted from. There can be different lists of data items for different kinds of process flows. Similarly, if the branch occurs at 603, corresponding to a selection of site 2, a similar screen will be displayed. Again, this screen consists of a list of common data items on the left part of the screen. However, in this case, the middle part of the screen lists location 2's or site two's values for those items. If there is an operation that compares on a one-for-one basis from location 2, then the right part of the screen lists location 1's or site one's values for those same data items. When there is no site selection, branching operations 602 and 603 default to A4 of FIG. 3a and the view options list is again displayed by operation 105.

Figure 3H:
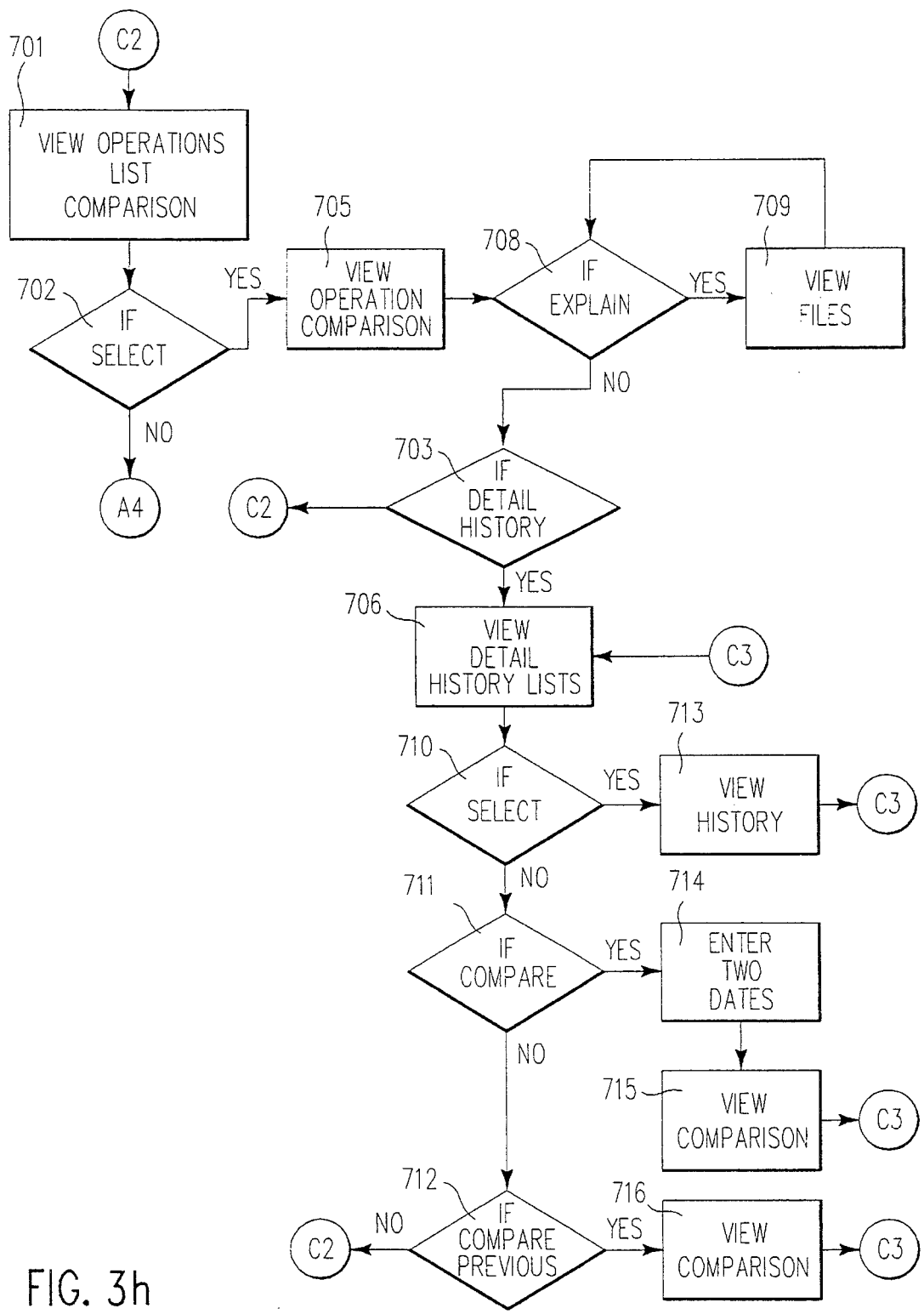

If selection of option 5 or 6 is detected by branching operations 205 or 206, respectively, the process continues as shown in FIG. 3h but with different data retrieved in accordance with the detection which caused the branch, as described above. First, an operations list is displayed at 701. This presents a list of site one or location 1's sectors and operations. Next to location 1's operation number is listed the second site's operation number if and only if there is a one-for-one comparison between the two sites operation. The knowledge of this comparison is found on the ILC conversion table. If a selection is not made, the operation returns to the options list at A4 of FIG. 3a. If a selection is made, a comparison is displayed at 705 which consists of a list of common data items on the left part of the screen. The middle part of the screen lists location 1's or site one's values for those items. The right part of the screen lists location 2's or site two's values for those same data items. The list of data items is from a table of standard data items which can be added to or subtracted from. There can be different lists of data items for different kinds of process flows. This display is similar to screen A003 but with the addition of the "explain" option. Further detail information can be retrieved through the "explain" option detected at 708, causing display 709 of corresponding files which is a hyper-text function to view selected files such as process documents and images referenced by the process documents. This option is reinvoked from within a displayed document to the limits of the user-ID's region space by looping back to 708, allowing a sequence or hierarchy of files to be viewed, including graphics images.

Selection of a detail history is then detected in the same manner as at 502 described above. If there is no detection of such a selection, the process returns to a display of the operations list at 701 for a further selection. Upon such a selection, a screen as illustrated in FIG. 12 is displayed at 706 in the same manner as at 506. Further detections of user selections are done at 710, 711 and 712 in the same manner as described with reference to FIG. 3f, above, but with a return to a display of the detail history lists at operation 706. Prompt 714 and displays 713, 715 and 716 also correspond to similar displays described above with reference to FIG. 5f. If all of branching operations 710–712 default, the process loops back to C2 to allow different selections. When no further selections are detected at 702, the process returns to the options list at 105.

Branch 207 detects selection of the seventh item in screen A026, illustrated in FIG. 6. In response, a list of unmatched titles is displayed at operation 209. The system will use the ILC conversion table and process all operations that are indicated to be identical. The operations will be compared to see if the titles are alike. All unmatched titles will be listed. Afterward, the process returns to the screen of FIG. 6 at 105.

If the eighth option is detected by 208, a list of operations that are found on the first site or location 1's process flow but have not been included in the ILC conversion table is displayed at operation 210. This feature is useful in prompting the user or system administrator to update the conversion tables of the ILC system. This feature is also preferably provided for other sites as shown at branching operation 301 and display 304 of FIG. 3c. In each case, the options menu of FIG. 6 is displayed after the display of options not found in the ILC conversion table.

Figure 3I:
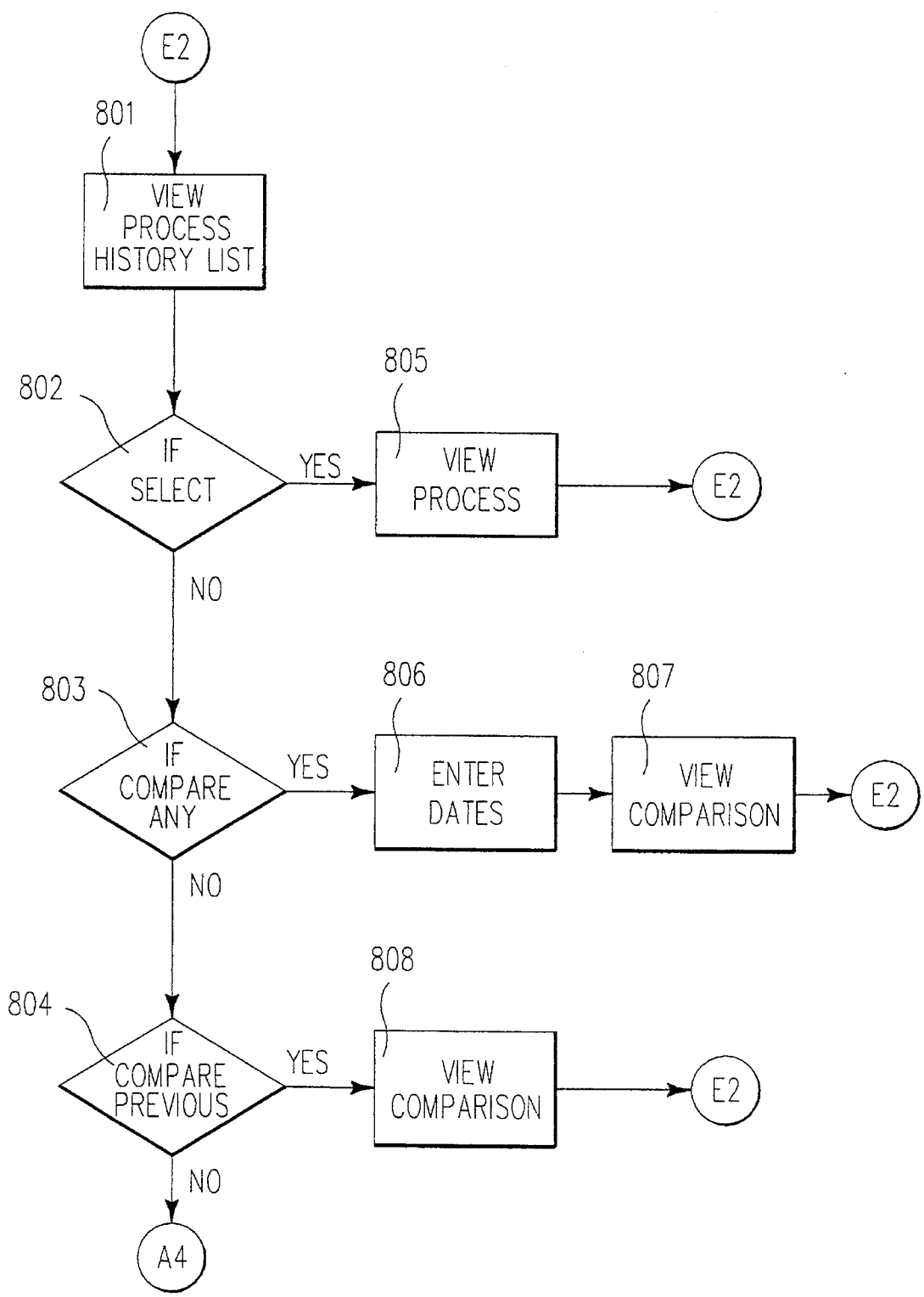
Figure 3J:
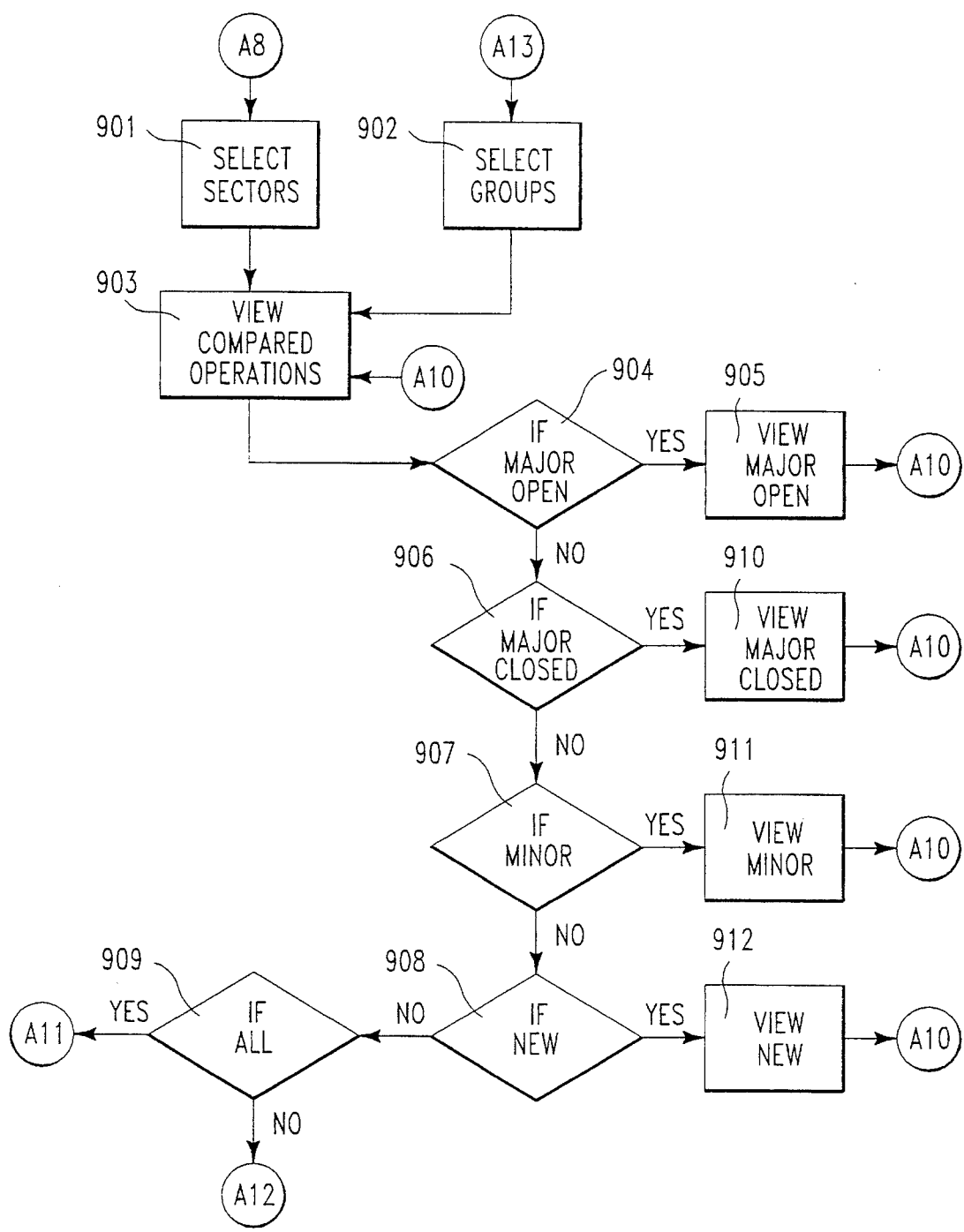
Figure 3K:
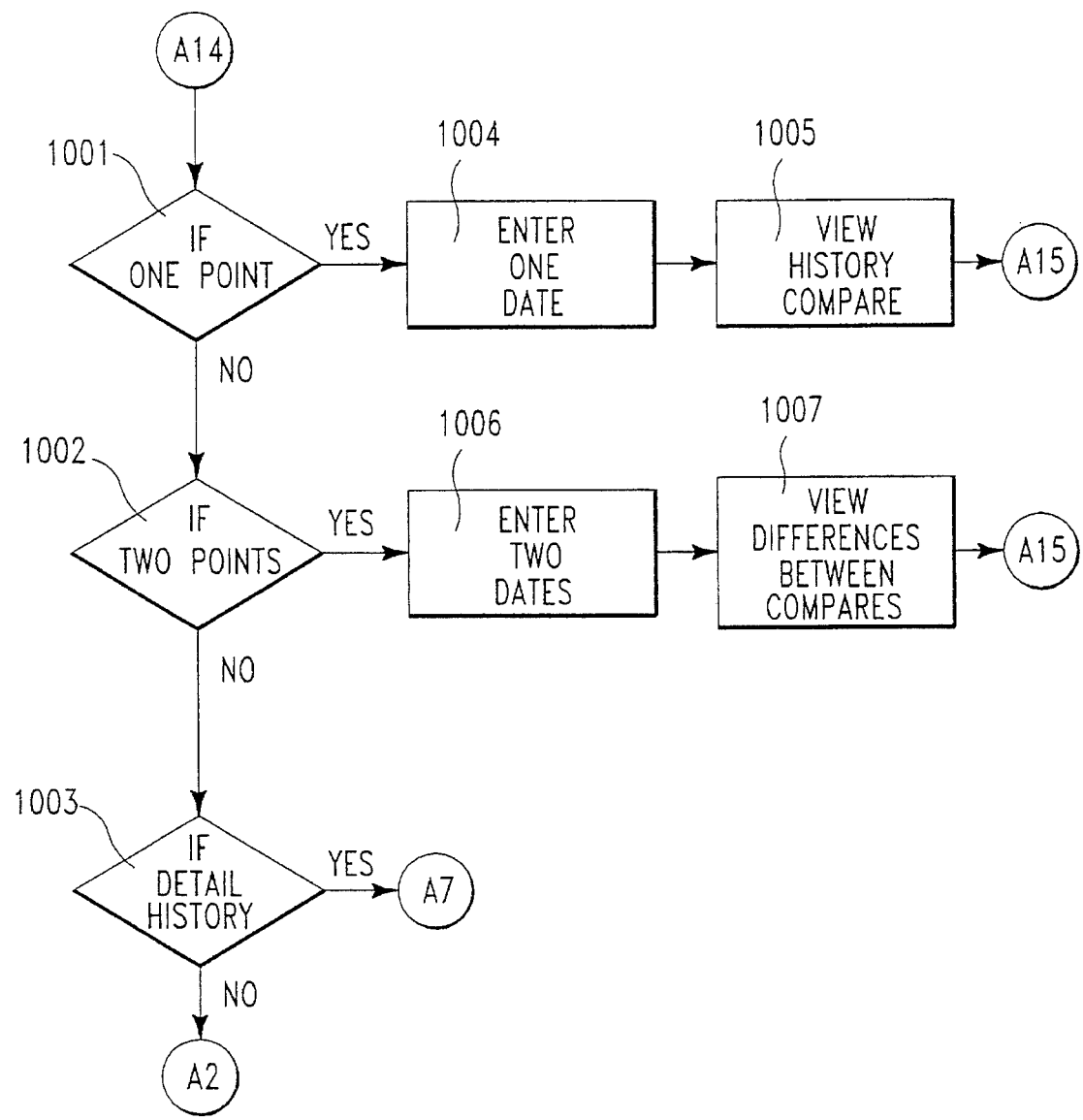

Selections of the tenth and eleventh options of FIG. 6, detected by branching operations 302 and 303, cause the process to continue at E2 of FIG. 3i. This will cause display, at 801, of a menu of the process flow history is presented consisting of the data, time and user-ID of the person making the change. The screen is similar to screen A008, illustrated in FIG. 12 except it is process flow history. The remaining processes and displays shown in FIG. 3i are similar to those described above with reference to FIG. 3f; returns looping to E2 and default causing the options list to again be displayed. Operation 805 provides a display of a view of the history from a point in time consisting of the sectors and operations. The same format as the original process flow. This is for location 1 or site one's process flow. Operation 807, after a user prompt at 806, provides a display of a comparison for the indicated dates. Location 1's sectors and operations for each date will be displayed side by side with most identical lines not displayed and the changed, moved, deleted and inserted lines indicated. Operation 808 provides a display of a comparison to the previous change. This is for location 1 or site one's process flow. For each date will be displayed side by side with most identical lines not displayed and the changed, moved, deleted and inserted lines indicated. Preferably, for reference of the operator, a single line preceding and following each line which has been changed, moved deleted or inserted will be displayed with the altered line and all other lines suppressed. However, other screen formats or forms of reference for an operator can be provided within the scope of the invention.

If no selection is made and all of the branching operations in FIGS. 3b and 3c default, the main menu of FIG. 4 will be displayed as the operations of FIG. 3a are re-entered at A9. This will also occur by branching at 106 unless the user desires to exit the ILC system.

It should be understood that the screens shown in FIGS. 4–12 are merely exemplary of a preferred embodiment of the invention presently contemplated by the inventors and that other screens or other types of data can be freely provided and modified in consideration of the operation with respect to which the invention is implemented. It is also to be understood that the freedom with which these screens and data presentation can be modified allows the ILC system, according to the invention, to be modified to adapt to any management procedures which may be deemed desirable.

For example, with reference to FIGS. 13–20, a set of alternative screens which may be used at, say, location 5 are shown. FIG. 13 shows an alternative form of screen A01B, shown in FIG. 9. As in FIG. 9, selection of the 02 option calls screen A003, shown in FIG. 14 which is similar to FIG. 10, but arranged to show different parameters corresponding to processes at site five or location 5. Similarly, selecting 04 calls a list of groups and selection 05 calls a list of sectors. However, in this case either screen A047 (FIG. 15) or screen A054 (FIG. 16) is called, respectively.

In FIG. 16, moving the cursor to a line and pressing the PF2 key allows the operator to flag each of a series of sectors. Thereafter pressing the PF4 key will dynamically generate detail displays using screen A050, shown in FIG. 18, for all sectors flagged, from the process flows. The appearance of the flagging operation using screen A054 is illustrated in FIG. 17 in which arrows are displayed at the left margin for flagged items.

From the screen A050 of FIG. 18 or screen A053 of FIG. 20, selection 06 (PF6) calls screen A057, shown in FIG. 19, from which further selections can be made as described above with respect to operations 904–912 of FIG. 3j. Also, in screen A047, shown in FIG. 15, if the cursor is paced on "Cold Process, Type K" and function key PF2 is pressed, screen A050, shown in FIG. 18 is presented. From screen A050 of FIG. 18, further selection of 06 (PF6) calls screen A057, shown in FIG. 19 in the same manner that the screen can be reached from FIG. 18, as described above. It will be recognized that the sequence of screens described with reference to FIGS. 13–20 is also produced by the methodology disclosed with respect to the flow chart of FIGS. 3a–3k. Further flexibility of choice of information to be displayed and the use of additional screens will be evident to those skilled in the art in view of the above-disclosed methodology. For example, at virtually any point in the process, an additional branching function can be provided to test for additional operator selections and appropriate screens called containing appropriate desired data. Returns to the ILC process after any screen will be apparent from the point in the process where such additional selections are added in the process illustrated in FIGS. 3a–3k, such as by returning to E2 if additional selections are provided in FIG. 3h. It should also be understood that a sequence of further selections could be provided in the manner illustrated in FIGS. 3e and 3f in a similar fashion.

It is to be understood that the overall ILC system is not reliant upon an identical process being carried out at all locations or sites participating in the ILC system. The screens and selection options as illustrated at FIGS. 4–12 can be carried out at one or a plurality of sites while variations such as those exemplified by FIGS. 13–20, with or without further selection options, could be carried out at other sites.

It is also to be understood that some minor selection such as display control functions 07, 08 and 09 of FIG. 7 (for backward and forward progression through a screen which is larger than the display space and for immediate printing of any screen) have been omitted from the flow chart of FIG. 3a–3k in the interest of clarity. However, these and other selections and control functions can be included in the system in the manner described above by providing a branching operation to test the selection and an appropriate subroutine to accomplish the function. In this regard, the print function is particularly useful to provide for the viewing of a screen which is larger than the display space and which, if necessary, can be done in the manner of a spreadsheet, as is well-understood in the art.

Also, to fully appreciate the invention, it should also be understood that to make any combination of data available in a desired format which is deemed useful to the formulation of management decisions, it is only necessary to determine the operations involving any number of the applications available on the VM system and to list them in a subroutine according to the language and operating system in use and modify a text screen forming a menu and identifying the item of interest with a unique alphanumeric identifier by which it can be retrieved and executed. By so doing, all of the applications available on the system will be made transparent to the user and data in the most usable contemplated form will be retrieved on-line from an automatically updated database.

In view of the foregoing, it is seen that a database system has been provided which access to information used in the management of manufacturing lines or other business endeavors no matter how widely separated geographically in real time and without constraint on data code, format or arrangements for assuring security or file integrity. The ILC system of the invention provides automatic and user-transparent access to data in a plurality of applications and in a plurality of forms and formats for presentation in a user-definable format for rapid assimilation thereof and provides for comparison of data between sites and from the selective point of view of any site based on a uniform concordance of equivalent data, regardless of the identity of individual operations at any site.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of data retrieval from a virtual machine system including a distributed resource, said virtual machine system having a plurality of nodes, each said node including a plurality of applications and local storage for storing data items, said method comprising the steps of storing selected data items from said distributed resource in said local storage including updating said local storage when one of a plurality of predetermined files of said distributed resource is altered, displaying a menu of predetermined data reporting options, selecting a data reporting option from said menu, invoking at least one of said applications in response to said selecting of said data reporting option and selecting ones of said data items from said local storage in response to said step of selecting a data reporting option, selecting further data from said local storage in response to said selecting of data items from said local storage based on a concordance of said data items and said selected data items from said distributed resource, and reporting said data and said further data in a predetermined format corresponding to said step of selecting a data reporting option from said menu.

2. A system for facilitating comparison of data from at least two data sources including a node of a network receiving data from at least one of said data sources and a shadow of data from another of said at least two data sources including means for storing said data and said shadow of data, means for displaying a menu of functions including at least one data reporting function and selecting a function therefrom, means responsive to said selection from said menu of functions for invoking at least one application at said node, said application including means for reporting data from said means for storing said data and said shadow of data through said at least one application, and means for selectively displaying said data reported through said at least one application.

3. A system as recited in claim 1, wherein said means for invoking said at least one application includes means for converting said data reported from said means for storing said data and said shadow of data from one data format to another data format.

4. A system as recited in claim 1, wherein said means responsive to said selection invokes a plurality of said applications at said node.

5. A system as recited in claim 1, further including means for updating data from said at least one of said data sources in said means for storing said data and said shadow of data.

6. A system as recited in claim 1, further including means for updating said shadow of data from said another of said at least two data sources.

7. A system as recited in claim 6, wherein said means for updating said shadow of data from said another of said at least two data sources includes means for transmitting data from said another data source to said node.

8. A system as recited in claim 7, wherein said means for transmitting said data to said node includes encryption means.

9. A system as recited in claim 1, wherein said means for displaying a menu of functions and selecting a function therefrom includes means for displaying another menu at another level of a hierarchy of functions.

10. A system as recited in claim 1, wherein said means for displaying a menu of functions and selecting a function therefrom includes means for specifying selection of at least said data and said shadow of data in a selectable order.

11. A system as recited in claim 10, further including means for selectively establishing a display format for said display of said data reported through said application.

12. A system as recited in claim 1, further including means for grouping data returned from said means for storing said data and said shadow of data into predetermined groups.

13. A system as recited in claim 12, wherein said means for grouping data includes a look-up table.

\* \* \* \* \*